(12) United States Patent
Mendonsa et al.

(10) Patent No.: US 11,948,612 B2
(45) Date of Patent: Apr. 2, 2024

(54) ZERO SKEW ELEVATOR SYSTEM

(71) Applicant: Seagate Technology LLC, Fremont, CA (US)

(72) Inventors: Riyan Alex Mendonsa, Edina, MN (US); Brett R Herdendorf, Mound, MN (US); Krishnan Subramanian, Shakopee, MN (US)

(73) Assignee: Seagate Technology LLC, Fremont, CA (US)

(*) Notice: Subject to any disclaimer, the term of this patent is extended or adjusted under 35 U.S.C. 154(b) by 0 days.

(21) Appl. No.: 17/942,370

(22) Filed: Sep. 12, 2022

(65) Prior Publication Data

US 2023/0005502 A1 Jan. 5, 2023

Related U.S. Application Data

(60) Continuation-in-part of application No. 17/712,513, filed on Apr. 4, 2022, now abandoned, which is a
(Continued)

(51) Int. Cl.
*G11B 5/56* (2006.01)
*G11B 5/012* (2006.01)
*G11B 21/12* (2006.01)

(52) U.S. Cl.
CPC ............ *G11B 5/56* (2013.01); *G11B 5/012* (2013.01); *G11B 21/12* (2013.01)

(58) Field of Classification Search
None
See application file for complete search history.

(56) References Cited

U.S. PATENT DOCUMENTS

| 4,034,613 A | 7/1977 | Halfhill et al. |
| 4,189,759 A | 2/1980 | Bauck et al. |
| (Continued) | | |

FOREIGN PATENT DOCUMENTS

| FR | 2749696 A1 | 12/1997 |
| JP | 2004079040 A | 3/2004 |
| (Continued) | | |

OTHER PUBLICATIONS

Office Action from U.S. Appl. No. 17/389,950, dated Nov. 16, 2021, 8 pages.
(Continued)

*Primary Examiner* — Peter Vincent Agustin
(74) *Attorney, Agent, or Firm* — Westman, Champlin & Koehler, P.A.

(57) ABSTRACT

A data storage device includes a data storage disc, an arm, a head, a rotary actuator, and an elevator. The disc has a read/write surface defining an x-y plane. The arm includes a load beam. The head is supported by the load beam, and the head is configured to interact with the read/write surface. The rotary actuator is configured to move a first portion of the arm about a first pivot axis in the x-y plane. The elevator is configured to move the arm in a z direction relative to a vertical surface and is configured to frictionally engage the vertical surface to hold the arm at a z direction position while allowing the rotary actuator to move the first portion of the arm about the first pivot axis. In another aspect, an apparatus includes a stack block, first and second clamp arm assemblies, and first and second piezoelectric actuators.

18 Claims, 23 Drawing Sheets

Related U.S. Application Data division of application No. 17/233,818, filed on Apr. 19, 2021, now Pat. No. 11,348,611.

(56) References Cited

U.S. PATENT DOCUMENTS

| | | | |
|---|---|---|---|
| 4,287,445 A | 9/1981 | Lienau | |
| 4,322,840 A | 3/1982 | Kusaka | |
| 4,376,294 A | 3/1983 | Meier et al. | |
| 4,392,165 A | 7/1983 | Wright | |
| 4,393,425 A | 7/1983 | Wright | |
| 4,462,054 A | 7/1984 | Dong et al. | |
| 4,545,046 A | 10/1985 | Jansen et al. | |
| 4,613,962 A | 9/1986 | Inoue et al. | |
| 4,631,611 A | 12/1986 | Schneider | |
| 4,663,682 A | 5/1987 | McNeil | |
| 4,672,490 A | 6/1987 | Shigenai et al. | |
| 4,703,375 A | 10/1987 | Chan et al. | |
| 4,730,226 A | 3/1988 | Shatkin | |
| 4,740,946 A | 4/1988 | Yumura et al. | |
| 4,742,410 A | 5/1988 | Smith | |
| 4,745,503 A | 5/1988 | Muraoka et al. | |
| 4,763,314 A | 8/1988 | McCaslin et al. | |
| 4,764,829 A | 8/1988 | Makino | |
| 4,792,707 A | 12/1988 | Katanuma | |
| 4,800,818 A | 1/1989 | Kawaguchi et al. | |
| 4,819,108 A | 4/1989 | Seki et al. | |
| 4,853,808 A | 8/1989 | Lutz | |
| 4,884,261 A | 11/1989 | Dalziel | |
| 4,888,751 A | 12/1989 | Yoshimaru et al. | |
| 4,902,971 A | 2/1990 | Guzik et al. | |
| 4,937,692 A | 6/1990 | Okutsu | |
| 4,974,104 A | 11/1990 | Ferguson et al. | |
| 5,007,712 A | 4/1991 | Kikuchi et al. | |
| 5,016,238 A | 5/1991 | Shtipelman et al. | |
| 5,023,737 A | 6/1991 | Yaeger | |
| 5,029,030 A | 7/1991 | Luecke | |
| 5,043,964 A | 8/1991 | Suzuki | |
| 5,070,423 A | 12/1991 | Gloski | |
| 5,079,652 A | 1/1992 | Ishida et al. | |
| 5,229,901 A * | 7/1993 | Mallary | G11B 5/5521 |
| 5,283,705 A | 2/1994 | Iwabunchi | |
| 5,307,224 A | 4/1994 | Minase | |
| 5,317,552 A | 5/1994 | Yamasaki | |
| 5,396,385 A | 3/1995 | Tangi et al. | |
| 5,463,514 A | 10/1995 | Yaeger | |
| 5,467,238 A | 11/1995 | Lee et al. | |
| 5,493,463 A | 2/1996 | Hagen | |
| 5,521,778 A * | 5/1996 | Boutaghou | G11B 5/5521 |
| | | | 360/78.05 |
| 5,672,435 A * | 9/1997 | Born | C22C 1/1036 |
| | | | 428/548 |
| 5,719,720 A | 2/1998 | Lee | |
| 5,781,381 A | 7/1998 | Koganezawa et al. | |
| 5,796,558 A | 8/1998 | Hanrahan et al. | |
| 5,801,531 A | 9/1998 | Viches et al. | |
| 5,825,180 A | 10/1998 | Guzik | |
| 5,875,166 A | 2/1999 | Ikegame et al. | |
| 5,898,544 A | 4/1999 | Krinke et al. | |
| 5,968,627 A | 10/1999 | Nigam et al. | |
| 6,025,975 A | 2/2000 | Fard et al. | |
| 6,043,957 A | 3/2000 | Hattori et al. | |
| 6,064,550 A | 5/2000 | Koganezawa | |
| 6,088,187 A | 7/2000 | Takaishi | |
| 6,088,194 A | 7/2000 | Imaino et al. | |
| 6,157,521 A | 12/2000 | Utsunomiya | |
| 6,157,522 A | 12/2000 | Murphy et al. | |
| 6,166,874 A | 12/2000 | Kim | |
| 6,310,750 B1 | 10/2001 | Hawwa et al. | |
| 6,344,950 B1 | 2/2002 | Watson et al. | |
| 6,356,640 B1 | 3/2002 | Lin | |
| 6,362,933 B1 * | 3/2002 | Sampietro | G11B 21/21 |
| 6,369,988 B1 | 4/2002 | Yoshida et al. | |
| 6,480,361 B1 | 11/2002 | Patterson | |
| 6,501,625 B1 | 12/2002 | Boismier et al. | |
| 6,515,834 B1 * | 2/2003 | Murphy | G11B 5/5552 |
| 6,535,356 B1 | 3/2003 | Heaton | |
| 6,549,377 B2 | 4/2003 | Yoshida et al. | |
| 6,590,748 B2 | 7/2003 | Murphy et al. | |
| 6,614,627 B1 | 9/2003 | Shimizu et al. | |
| 6,717,776 B2 | 4/2004 | Boutaghou | |
| 6,765,744 B2 | 7/2004 | Gomez et al. | |
| 6,862,154 B1 | 3/2005 | Subrahmanyam et al. | |
| 6,972,924 B1 | 12/2005 | Chen et al. | |
| 6,987,637 B2 | 1/2006 | Litvinov et al. | |
| 7,027,147 B2 | 4/2006 | Steenhoek et al. | |
| 7,072,147 B2 | 7/2006 | Limmer et al. | |
| 7,085,092 B2 | 8/2006 | Koganezawa | |
| 7,126,785 B1 * | 10/2006 | Li | G11B 5/5552 |
| 7,130,160 B2 | 10/2006 | Kwon et al. | |
| 7,131,346 B1 | 11/2006 | Buttar et al. | |
| 7,199,981 B2 | 4/2007 | Zabtcioglu | |
| 7,336,436 B2 | 2/2008 | Sharma et al. | |
| 7,372,671 B2 | 5/2008 | Yazawa | |
| 7,375,930 B2 | 5/2008 | Yang et al. | |
| 7,489,464 B1 | 2/2009 | McNab et al. | |
| 7,492,542 B2 | 2/2009 | van Zyl | |
| 7,652,847 B2 | 1/2010 | Weiss et al. | |
| 7,672,083 B1 | 3/2010 | Yu et al. | |
| 7,710,683 B2 | 5/2010 | Craig et al. | |
| 8,824,094 B1 | 9/2014 | Furlong et al. | |
| 8,958,172 B1 | 2/2015 | Hansen | |
| 8,958,173 B1 | 2/2015 | Hirano et al. | |
| 9,218,833 B1 * | 12/2015 | Shah | G11B 21/22 |
| 9,361,919 B1 | 6/2016 | Lieu et al. | |
| 9,424,866 B1 | 8/2016 | Cao et al. | |
| 10,192,575 B1 | 1/2019 | Resh | |
| 10,249,339 B1 | 4/2019 | Mendonsa et al. | |
| 10,269,380 B1 | 4/2019 | Sun et al. | |
| 10,431,246 B2 | 10/2019 | Zhu et al. | |
| 10,510,373 B1 | 12/2019 | Granz et al. | |
| 10,622,012 B1 | 4/2020 | Tu et al. | |
| 10,699,730 B1 | 6/2020 | Uefune et al. | |
| 10,706,879 B2 | 7/2020 | Garbarino | |
| 10,803,891 B1 | 10/2020 | Jacoby et al. | |
| 10,818,317 B1 | 10/2020 | Erden et al. | |
| 10,839,838 B1 | 11/2020 | Tu et al. | |
| 10,978,100 B1 | 4/2021 | Myers | |
| 11,037,590 B2 | 6/2021 | Nguyen et al. | |
| 11,062,734 B1 | 7/2021 | Brand | |
| 11,120,834 B1 | 9/2021 | Herdendorf et al. | |
| 11,348,610 B1 | 5/2022 | Herdendorf et al. | |
| 11,348,611 B1 * | 5/2022 | Mendonsa | G11B 21/22 |
| 11,361,787 B1 | 6/2022 | Mendonsa et al. | |
| 2002/0044371 A1 | 4/2002 | Bement et al. | |
| 2002/0067565 A1 | 6/2002 | Kelemen | |
| 2002/0105750 A1 | 8/2002 | Li et al. | |
| 2003/0074783 A1 | 4/2003 | Boismier et al. | |
| 2003/0128456 A1 | 7/2003 | Shitara et al. | |
| 2004/0008609 A1 * | 1/2004 | Fujibayashi | G11B 7/08582 |
| | | | 720/675 |
| 2004/0032686 A1 | 2/2004 | Koganezawa | |
| 2004/0087253 A1 | 5/2004 | Mahadev et al. | |
| 2004/0130320 A1 | 7/2004 | Guzik et al. | |
| 2004/0179465 A1 | 9/2004 | Kuwajima et al. | |
| 2004/0257710 A1 | 12/2004 | Limmer et al. | |
| 2005/0152072 A1 | 7/2005 | Kwon et al. | |
| 2005/0225875 A1 * | 10/2005 | Wada | G11B 7/0932 |
| 2005/0280945 A1 | 12/2005 | Duvall et al. | |
| 2006/0171068 A1 | 8/2006 | Taguchi | |
| 2007/0279804 A1 | 12/2007 | White | |
| 2007/0297085 A1 * | 12/2007 | Zhang | G11B 5/6005 |
| 2008/0084636 A1 | 4/2008 | Oh et al. | |
| 2009/0073608 A1 | 3/2009 | Ookawa et al. | |
| 2010/0246068 A1 | 9/2010 | Lee | |
| 2011/0038074 A1 | 2/2011 | Viskochil et al. | |
| 2012/0206830 A1 | 8/2012 | Gao et al. | |
| 2013/0094106 A1 * | 4/2013 | Chua | G11B 5/4873 |
| | | | 29/603.01 |
| 2014/0139953 A1 | 5/2014 | Hatch | |
| 2016/0171993 A1 | 6/2016 | Okubo | |
| 2018/0301162 A1 | 10/2018 | Erden | |
| 2020/0027477 A1 * | 1/2020 | Garbarino | G11B 5/56 |
| 2020/0027480 A1 | 1/2020 | Myers et al. | |
| 2020/0202891 A1 | 6/2020 | Mendonsa et al. | |

(56) References Cited

U.S. PATENT DOCUMENTS

2020/0227077 A1* 7/2020 Sukla .................. G11B 5/4813
2021/0312945 A1 10/2021 Mendonsa et al.
2022/0335970 A1* 10/2022 Mendonsa ............... G11B 5/56
2023/0005502 A1* 1/2023 Mendonsa ............... G11B 5/56

FOREIGN PATENT DOCUMENTS

| KR | 940004494 B1 | 5/1994 |
|---|---|---|
| KR | 100353719 B1 | 12/2002 |
| WO | 9827546 A1 | 6/1998 |

OTHER PUBLICATIONS

U.S. Appl. No. 17/389,950, filed Jul. 30, 2021, "Zero Skew Disk Drive With Dual Actuators", 56 pages.

U.S. Appl. No. 17/196, 192, filed Mar. 9, 2021, "Rotating Ramp With Retraction Capability for a Disk Drive", 33 pages.

U.S. Appl. No. 17/016,326, filed Sep. 9, 2020, "Brake Crawler for Elevator-Type Hard Disk Drives", 30 pages.

U.S. Appl. No. 17/223,447, filed Apr. 6, 2021, "Data Storage Device Linear Actuator", 36 pages.

U.S. Appl. No. 16/863,287, filed Apr. 30, 2020, "Split Ramp for Data Storage Devices", issuing as U.S. Pat. No. 11,094,347 on Aug. 17, 2021, 22 pages.

U.S. Appl. No. 17/163,983, filed Feb. 1, 2021, "Ramp Activation Systems for an Elevator Drive", 34 pages.

U.S. Appl. No. 17/172,684, filed Feb. 10, 2021, "Adjusting HGA Z-Height via HSA Elevator Using Head/Actuator Feedback", 24 pages.

Cordle, M., "Effects of Skew Angle and Transition Curvature in HAMR Hard Disc Drives," a thesis submitted to the Faculty of the University of Minnesota, May 2017.

He, Z., Mou, J. and Chan, K., "Mechanisms of Minimum Skew Angle Actuation for Hard Disc Drives," MATEC Web of Conferences, EDP Sciences, 2016.

Notice of Allowance from U.S. Appl. No. 17/389,950, dated Feb. 16, 2022, 10 pages.

U.S. Patent Office issued prosecution for U.S. Appl. No. 17/233,818, filed Apr. 19, 2021, including: Supplemental Notice of Allowability issued Feb. 24, 2022, 3 pages; Notice of Allowance and Fees Due (PTOL-85) issued Feb. 2, 2022, 7 pages; Applicant Initiated Interview Summary issued Nov. 15, 2021, 2 pages; Non-Final Rejection issued Oct. 22, 2021, 8 pages; Requirement for Restriction-Election issued Sep. 20, 2021, 6 pages; 26 pages total.

Notice of Allowance from U.S. Appl. No. 17/517,061, dated Aug. 10, 2022, 12 pages.

U.S. Appl. No. 17/712,513, filed Apr. 4, 2022, "Zero Skew Elevator System", 51 pages.

Final Rejection from U.S. Appl. No. 17/712,513, dated Apr. 17, 2023, 8 pages.

Non-Final Rejection from U.S. Appl. No. 17/712,513, dated Jan. 9, 2023, 11 pages.

Applicant Initiated Interview Summary from U.S. Appl. No. 17/712,513, dated Mar. 7, 2023, 2 pages.

Notice of Allowance from U.S. Appl. No. 17/479,679, dated Sep. 22, 2022, 7 pages.

Office Action from U.S. Appl. No. 17/479,679, dated Jul. 5, 2022, 9 pages.

Notice of Allowance from U.S. Appl. No. 17/528,296, dated Jul. 14, 2022, 9 pages.

Applicant Initiated Interview Summary from U.S. Appl. No. 17/712,513, dated May 18, 2023, 2 pages.

Advisory Action from U.S. Appl. No. 17/712,513, dated Jun. 2, 2023, 4 pages.

Non-Final Rejection from U.S. Appl. No. 17/809,062, dated Apr. 17, 2023, 12 pages.

* cited by examiner

ZERO SKEW ELEVATOR SYSTEM

CROSS-REFERENCE TO RELATED APPLICATION(S)

This application is a continuation-in-part of U.S. patent application Ser. No. 17/712,513, filed on Apr. 4, 2022; which is a divisional of U.S. patent application Ser. No. 17/233,818, filed on Apr. 19, 2021, and issued as U.S. Pat. No. 11,348,611 on May 31, 2022. The contents of these priority applications are hereby incorporated by reference in their entireties.

SUMMARY

In one embodiment, a data storage device comprises a data storage disc, an arm that is movable relative to the disc, a head, a rotary actuator, and an elevator. The data storage disc has a read/write surface defining an x-y plane. The arm comprises a first portion and a load beam. The head is supported by the load beam, and the head is configured to interact with the read/write surface. The rotary actuator is configured to move the first portion of the arm about a first pivot axis in the x-y plane. The elevator is configured to move the arm in a z direction relative to a vertical surface and is configured to frictionally engage the vertical surface to hold the arm at a z direction position while allowing the rotary actuator to move the first portion of the arm about the first pivot axis.

In another embodiment, an apparatus comprises a stack block, first and second clamp arm assemblies, and first and second piezoelectric actuators. The stack block is configured to rotate about a first pivot axis, and the stack block has a vertical surface. The first clamp arm assembly is configured to selectively frictionally engage the vertical surface. The second clamp arm assembly is also configured to selectively frictionally engage the vertical surface. The first piezoelectric actuator is configured to move the first clamp arm assembly into and out of engagement with the vertical surface; the first clamp arm assembly is positionally held to the vertical surface when the first clamp arm assembly is engaged with the vertical surface. The stack block is rotatable about the first pivot axis when the first clamp arm assembly is engaged with the vertical surface. The second piezoelectric actuator is configured to move the second clamp arm assembly relative to the first clamp arm assembly and relative to the vertical surface.

In yet another embodiment, a method comprises providing a data storage disc having a read/write surface defining an x-y plane; providing an arm that is movable relative to the disc, the arm comprising a first portion and a load beam; providing a head supported by the load beam, wherein the head is configured to interact with the read/write surface; enabling the arm to be moveable in a z direction relative to a vertical surface; and holding the arm at a z direction position by frictionally engaging the vertical surface while enabling the first portion of the arm to be moveable about a first pivot axis in the x-y plane.

Other features and benefits that characterize embodiments of the disclosure will be apparent upon reading the following detailed description and review of the associated drawings.

DETAILED DESCRIPTION OF ILLUSTRATIVE EMBODIMENTS

In general, in order to keep read/write heads from landing on one or more discs in a hard disc drive (HDD) when, for example, power is removed from the HDD, and to prevent the heads from colliding with outer edges of the discs during load and unload operations, a head-support ramp is provided adjacent to an outer diameter (OD) of the disc or discs. In current HDDs, a number of heads is equal to a number of disc surfaces, and the heads are rotated for positioning over their corresponding disc surfaces. There is typically no up/down movement of the heads in such HDDs. However, in an "elevator" drive, for example, the number of heads employed is less than the number of disc surfaces, and a head stack assembly (HSA) including the fewer number of heads is moved up/down to enable a single head to read from multiple disc surfaces. The up/down movement is possible when the HSA is rotated such that the heads are away from the discs and are supported on a ramp. Conventional ramps are a single unit with an edge of the ramp over the OD of the discs. This ramp design prevents up/down movement of the ramp along with the HSA because the edge of the ramp over the OD may collide with the discs during up/down movement of the ramp.

To address this above-noted problem, some embodiments of the disclosure employ a split ramp including a first ramp portion adjacent to the OD of the discs and a vertically moveable ramp portion that is adjacent to the first ramp portion. To enable up/down movement of the HSA, the HSA is first rotated away from the discs and away from the first ramp (if any), and positioned such that the heads are supported on a moveable ramp portion. Then, the HSA and the moveable portion of the ramp are moved in unison by an elevator in the HDD.

Figure 1:
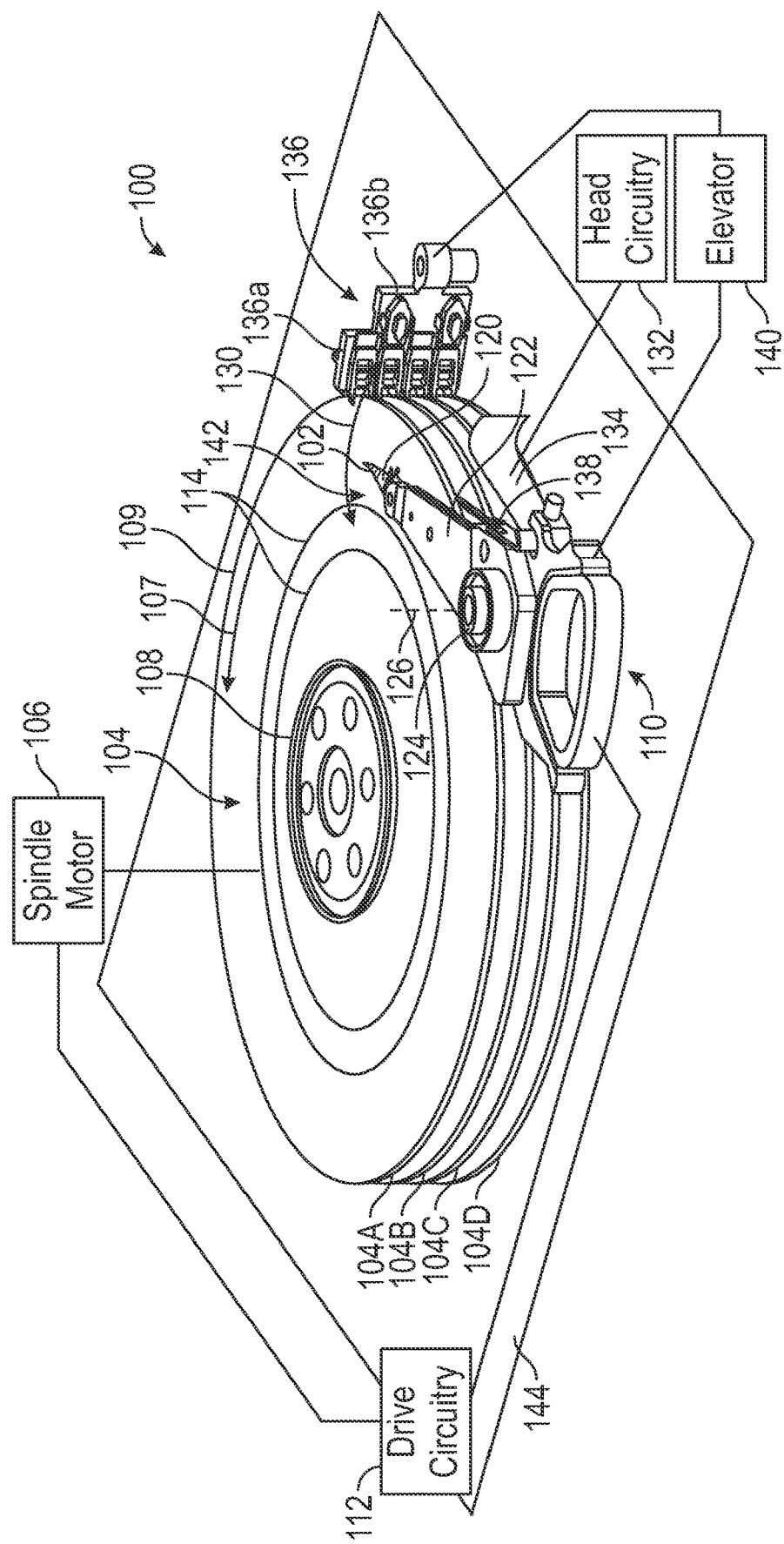
FIG. 1 is a schematic illustration of an exemplary data storage device.

FIG. 1 shows an illustrative operating environment in which certain embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same reference numerals (or reference numerals indexed in increments of hundreds such as 148, 248, 348, for example) are used in different figures for the same or similar elements. All descriptions of an element also apply to all other versions of that element unless otherwise stated. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a schematic illustration of a data storage device (DSD) 100 including data storage media, heads for reading data from and/or writing data to the data storage media and a split ramp for supporting the heads. In data storage device 100, heads 102 may be positioned over storage media 104 to read data from and/or write data to the data storage media 104. In the embodiment shown in FIG. 1, the data storage media 104 are rotatable data storage discs, with each disc 104 having opposing surfaces that serve as data storage surfaces. For read and write operations, a spindle motor 106 (illustrated schematically) rotates the media 104 as illustrated by arrow 107 and an actuator mechanism 110 positions the heads 102 relative to data tracks 114 on the rotating media 104 between an inner diameter (ID) 108 and an outer diameter (OD) 109. Both the spindle motor 106 and actuator mechanism 110 are connected to and operated through drive circuitry 112 (schematically shown).

Each of heads 102 is coupled to the actuator mechanism 110 through a suspension assembly which includes a load beam 120 connected to an actuator arm 122 of the mechanism 110, for example through a swage connection. The actuator mechanism 110 is rotationally coupled to a frame or base deck 144 through a bearing 124 to rotate about axis 126. The actuator mechanism 110 moves the heads 102 in a cross-track direction as illustrated by arrow 130. Each of the heads 102 includes one or more transducer elements (not shown) coupled to head circuitry 132 through flex circuit 134.

In general, in order to keep read/write heads 102 from landing on discs 104 in a data storage device 100 when, for example, power is removed from the data storage device 100, and to prevent the heads 102 from colliding with outer edges of the discs 104 during load and unload operations, a head support ramp assembly 136 is provided adjacent to the OD 109 of the discs 104. In data storage device 100, a number of heads 102 is less than a number of disc 104 surfaces. In the particular embodiment shown in FIG. 1, data storage device 100 includes four discs 104A, 104B, 104C, 104D, with a total of 8 data storage surfaces, and two heads 102. As noted above, each of the two heads 102 is coupled to the actuator mechanism 110 through a suspension assembly which includes a load beam 120 connected to an actuator arm 122. The actuator mechanism 110, the load beams 120 and the actuator arms 122 are collectively referred to as the head stack assembly (HSA) 138.

In data storage device 100 of FIG. 1, the HSA 138 may be moved along axis 126 to different positions under motive of an elevator 140, which is schematically shown in FIG. 1. In an uppermost position shown in FIG. 1, the two heads 102 interact with upper and lower data storage surfaces of disc 104A. In other positions (not shown), which are below the uppermost position, the same two heads interact with data storage surfaces of discs 104B, 104C and 104D.

To enable the up/down movement of the HSA 138, head-support ramp 136 in some embodiments is designed as a split ramp with a stationary portion 136a and moveable portion 136b. In order to move the HSA 138 from either an upper position to a lower position or from a lower position to an upper position, the HSA 138 is first rotated about axis 126, or otherwise moved in the x-y plane, until a head end 142 of the HSA 138 is supported on the moveable portion 136b of the head-support ramp assembly 136. Then, the HSA 138 and the moveable portion 136b are moved in unison along axis 126 (such as vertically or in a z direction).

An entire ramp 136 or a portion thereof can also be moved in the x-y plane off the disc stack, such as by retraction, flexing, or rotation, for example.

In one embodiment, a base of elevator 140 may be driven up and down by a coil and a magnet (not shown) with hard stops at both ends that limit the extent of upward and downward movement of the HSA 138. In general, any suitable driving mechanism may be used to move elevator 140 up and down. Exemplary drivers for Z direction motion of elevator 140 include a ball screw with an internal motor, a voice coil motor, an inchworm style brake crawler, a linear motor, a shape memory alloy based actuator, and a combination of the above.

Head support ramp assembly 136 supports head end 142 of HSA 138 when the HSA 138 is moved away from the data storage disc(s) 104. In some embodiments, head support ramp assembly 136 includes a first ramp portion 136a adjacent to the OD 109 of the data storage disc(s) 104 and a second ramp portion 136b adjacent to the first ramp portion 136a.

Figure 3:
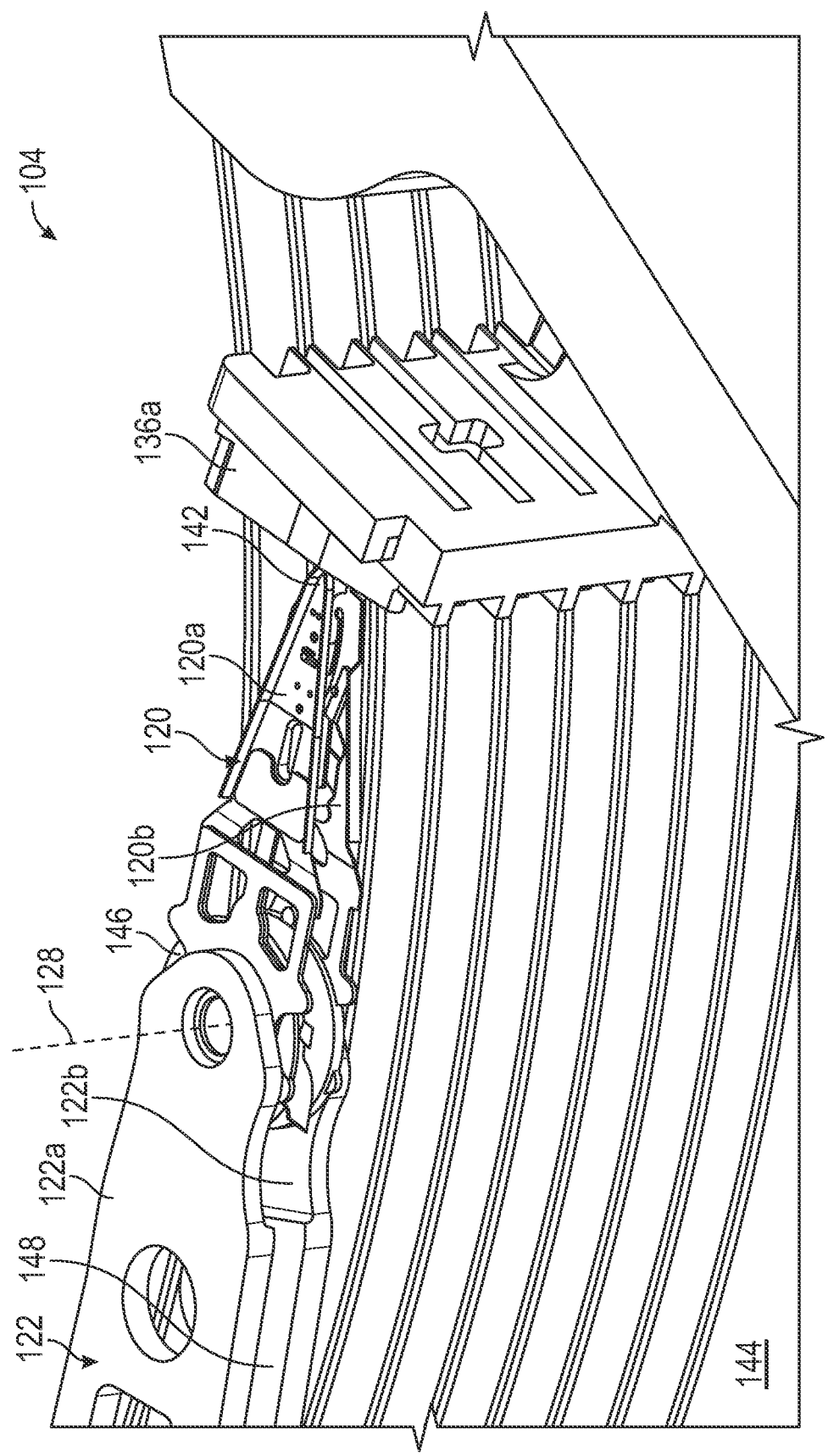
FIG. 3 is an enlarged view of a portion of FIG. 2.

As labeled in FIG. 3, in some embodiments of a zero skew elevator system, actuator arm 122 includes upper plate 122a and lower plate 122b separated by channel 148. Upper load beam portion 120a and lower load beam portion 120b carry heads 102 for reading and writing on top and bottom surfaces of adjacent discs 104. A lift tab extends from the load beam 120 to rest on the head support ramp assembly 136 when the disc drive storage device 100 is in an off or non-operating state.

Figure 4:
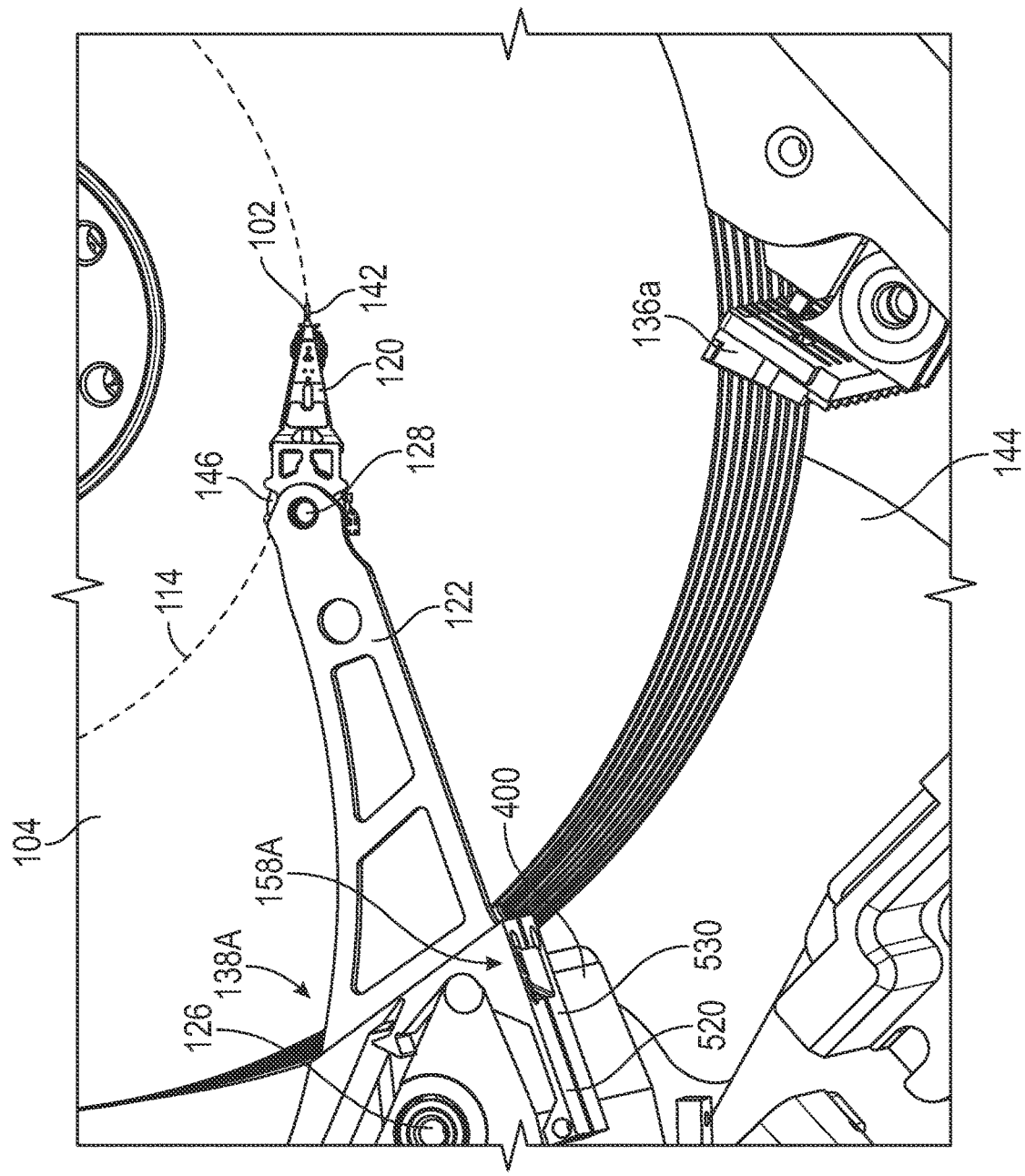
FIG. 4 is a perspective view of the data storage device of FIG. 2, with the actuator arm in a second configuration.
Figure 9:
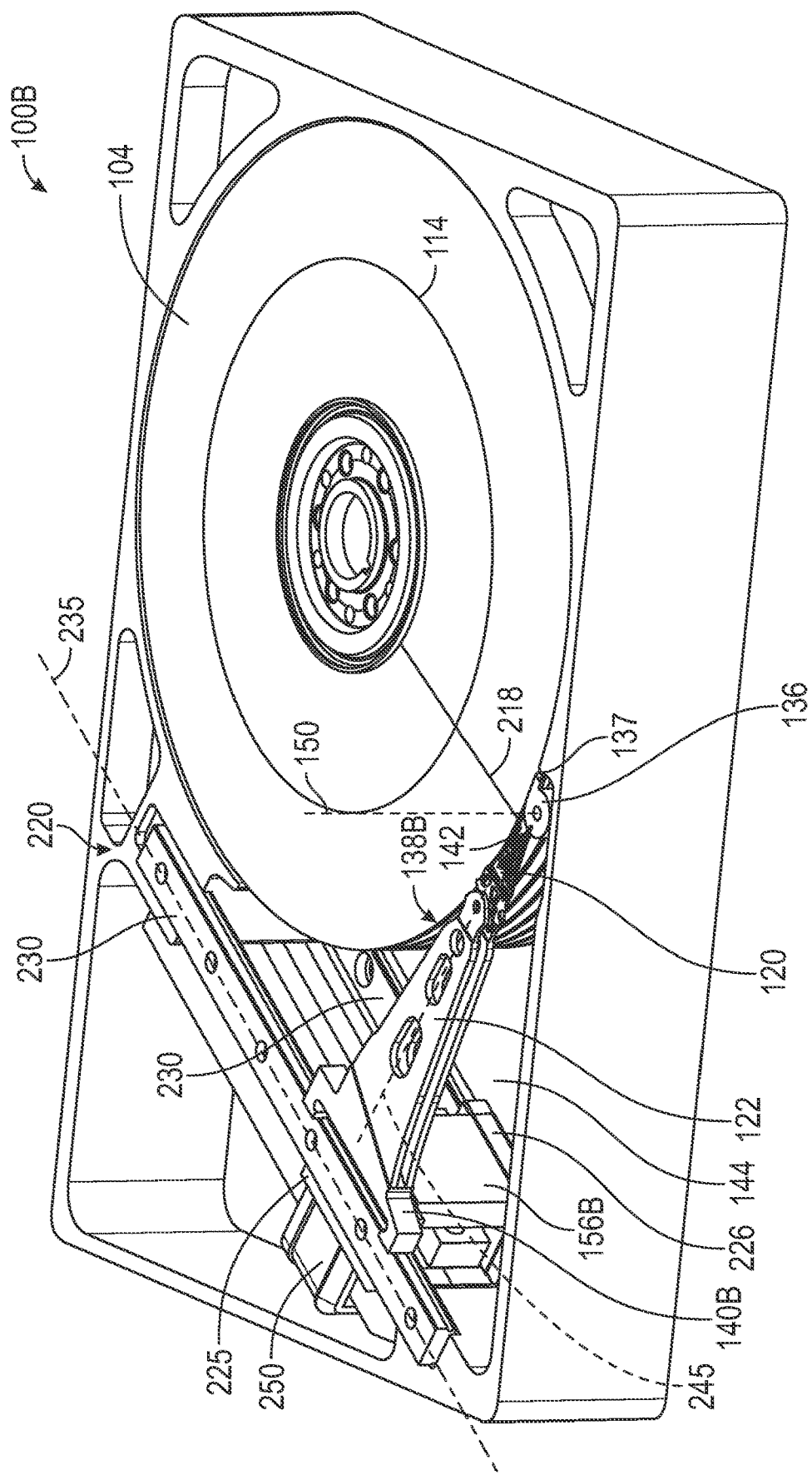
FIG. 9 is a perspective view of a data storage device with a second embodiment of a zero skew elevator system.
Figure 10:
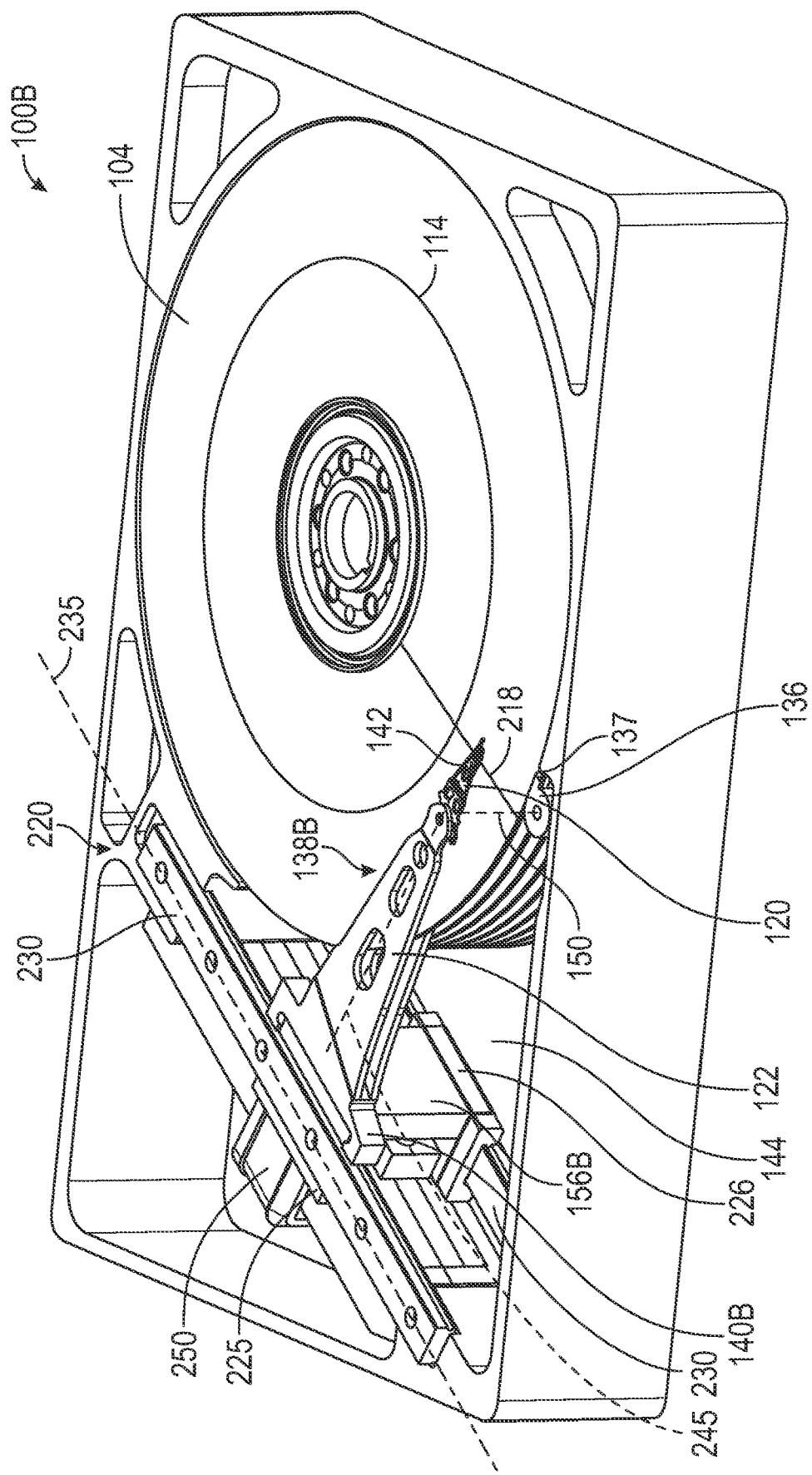
FIG. 10 is a perspective view of the data storage device of FIG. 9, with the actuator arm in a second position.

For use of heads 102 for reading and writing data relative to disc 104, actuator 110 is activated to rotate or slide the actuator arm 122, to thereby move the head end 142 of HSA 138 off of the head support ramp assembly 136 and to the disc 104, as shown in FIGS. 4, 9 and 10. In some illustrations, a movable ramp portion 136b is not shown but may be used with any embodiment of a disc storage device.

Figure 2:
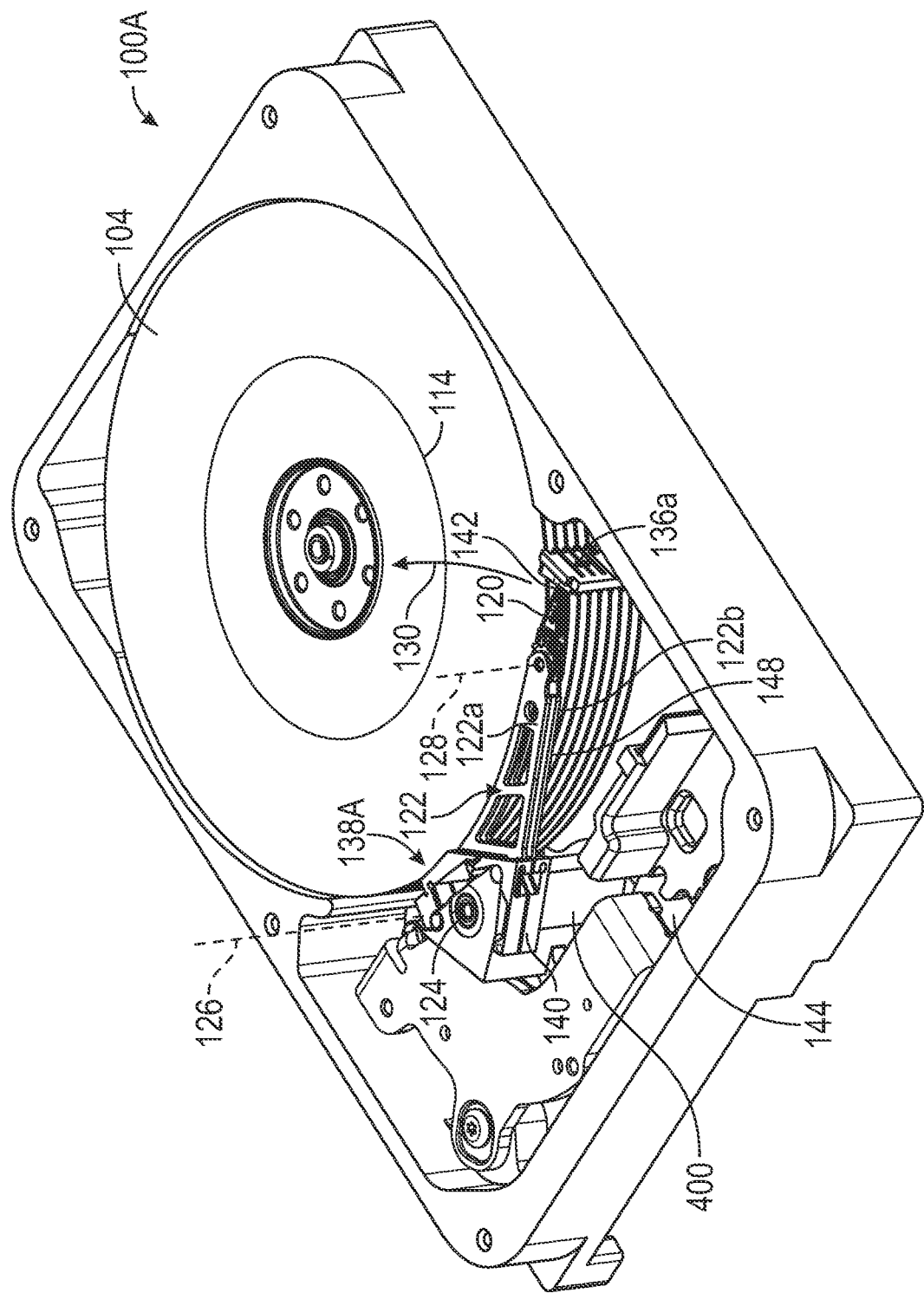
FIG. 2 is a perspective view of a data storage device with a first embodiment of a zero skew elevator system.

Referring to FIG. 2, a guide post for vertical movement of actuator arm 122 is configured as a stack block 400. As shown in FIGS. 2, 4, 8B-8D and 15A-15D, elevator 140 of this embodiment is configured as brake crawler 158A. Brake crawler 158A has elevator functions carried out by clamp arm assemblies 520, 530 and piezoelectric element 540; brake crawler 158A also has brake functions carried out by clamp arms 522 and piezoelectric element 526. The brake crawler 158A carries arm 122, and the entire stack block 400 rotates about cylindrical bearing 124 and pivot axis 126 to move head end 142 of HSA 138A relative to a disc 104. One can appreciate that rotation of arm 122 about pivot axis 126 results in moving the head end 142 of HSA 138A in an arc-shaped cross track direction 130 that is not truly on a radius of the disc 104. Accordingly, with an actuator arm 122, in most positions of the head 102 on disc 104, there is some skew between the head orientation and the true track orientation of a track 114. Accordingly, as shown in FIG. 4, the load beam 120 is rotated relative to the actuator arm 122 at a second pivot axis 128 to eliminate (or substantially eliminate) any skew angle and align the head 102 with a selected track 114.

As shown in FIGS. 2-4, HSA 138A is able to position head 102 relative to disc 104 in a selected cross disk position along arc 130 (about a first pivot axis 126) and with a corrected zero skew orientation of the head 102 relative to any particular track 114 due to rotation of load beam 120 relative to actuator arm 122 about a second pivot axis 128. In an exemplary embodiment shown in FIG. 3, pivot bearing 146 connects upper load beam portion 120a to upper load arm 122a and connects lower load beam portion 120b to lower load arm 122b in channel 148. A suitable pivot pin or other connector is not shown so as to not obstruct a view of the discussed components. Connections between actuator 110 and pivot bearing 146 can be provided in channel 148. A MEMS (micro-electromechanical system) based actuator or VCM based actuator at pivot bearing 146 is used in an exemplary embodiment for controlling an angle of the load beam 120 relative to the actuator arm 122 to align head 102 with a selected data track 114 with little or no skew.

Figure 5:
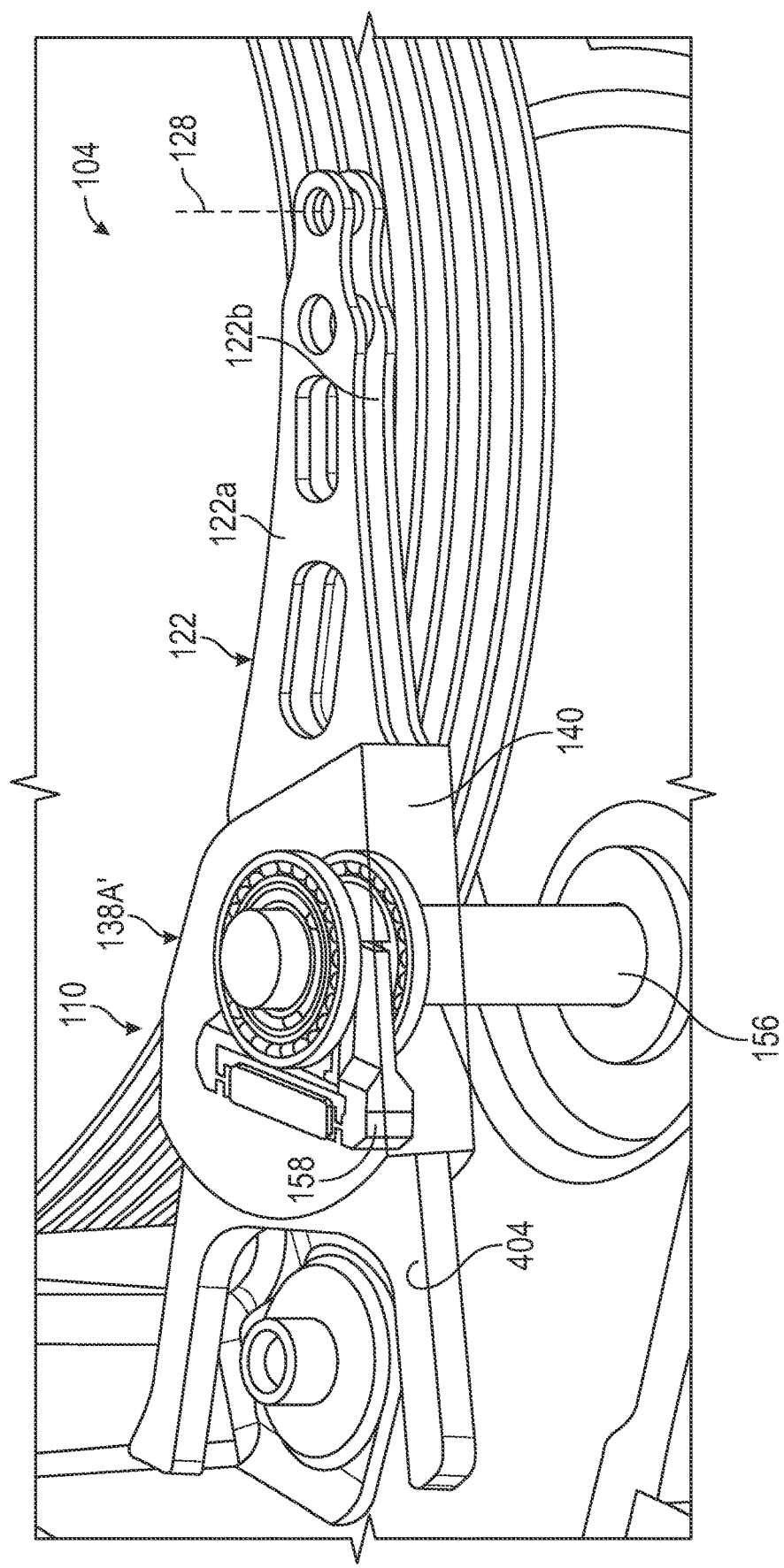
FIG. 5 is a perspective, partially transparent view of a brake assembly incorporated into an elevator according to one aspect of the disclosure.

FIG. 5 is a perspective, partially transparent view of a brake assembly 158 incorporated into HSA 138A' having an elevator 140 according to one aspect of the disclosure. Brake assembly 158 is used to maintain actuator arm 122 in a desired z direction position. In an exemplary embodiment, brake assembly 158 is located within the HSA 138A' so that the actuator arm 122 and brake assembly 158 move in unison vertically along guide post 156.

Figure 6:
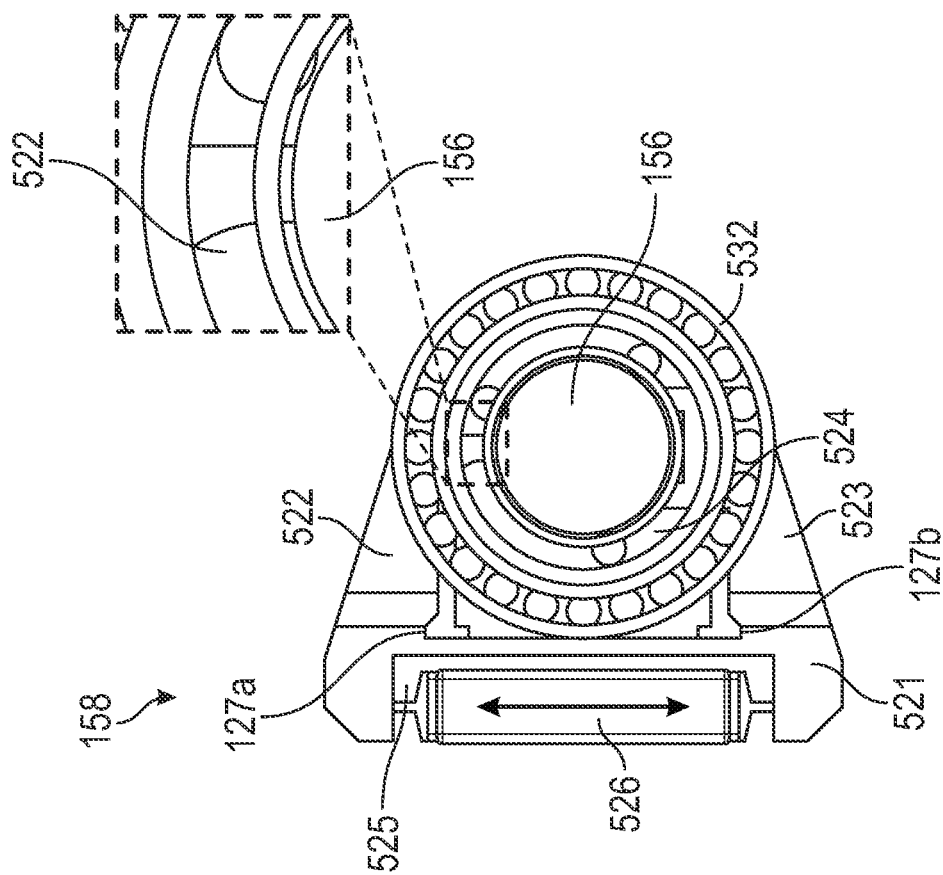
FIG. 6 is a top plane view of the brake assembly of FIG. 5, with the brake deactivated.
Figure 7:
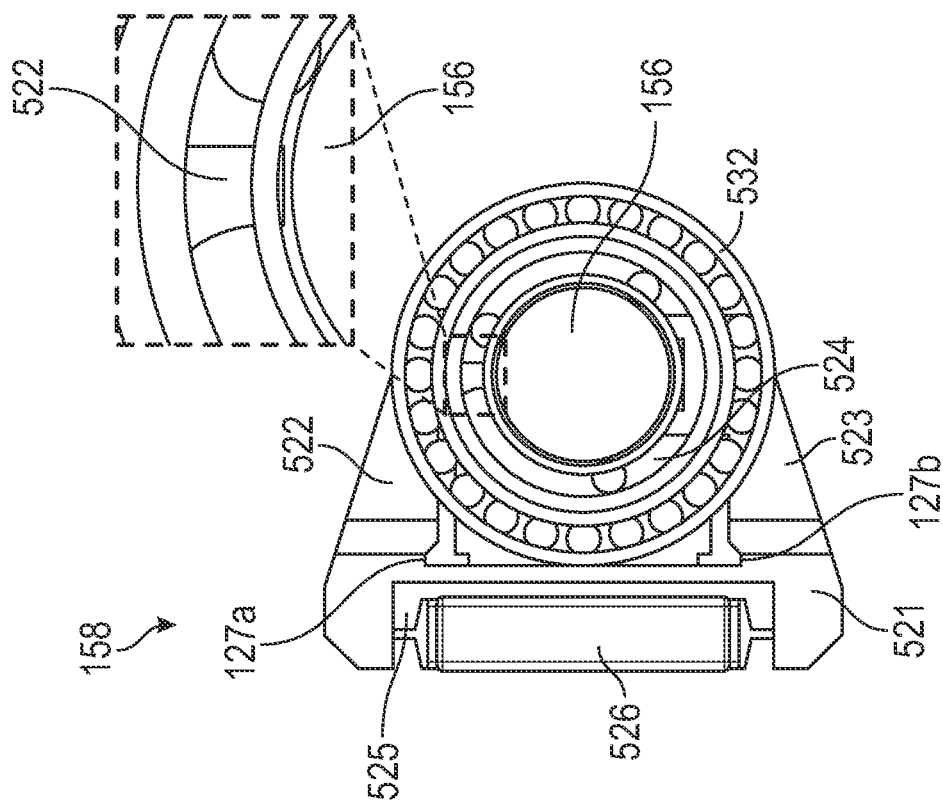
FIG. 7 is a top plane view of the brake assembly of FIG. 5, with the brake activated.

As shown in FIGS. 6 and 7, the brake assembly 158 generally includes a first clamp arm 522 generally located at one end of a base portion 521, while the second clamp arm 523 is located at the opposite end of the base portion 521. The first clamp arm 522 and the second clamp arm 523 extend from the base portion 521 in the same direction, such that they define an opening 524 between the first and second clamp arms 522, 523. When the brake assembly 158 is mounted on the vertical guide post 156, the vertical guide post 156 resides within in the opening 524.

The base portion 521 include a recess 525 within which is disposed an actuator element 526 configured to move the arms 522, 523 when activated. Reference herein to an actuator element may include any type of device capable of moving arms 522, 523. For sake of simplicity, the remainder of this Detailed Description will refer to a brake actuator element as a piezoelectric element, which is one type of suitable actuator element that changes in size when activated to thereby move arms 522, 523. However, it should be appreciated that many other types of actuator elements are also suitable, such as magnetic or shape memory alloys or bimetallics. The piezoelectric element 526 may be sized such that it has approximately the same length as the recesses 525 when in a non-activated state (shown in FIG. 6). In this manner, when the piezoelectric element 526 is activated to expand in size, such as expansion in the length direction shown by the arrow in FIG. 7, the piezoelectric element 526 pushes against the base portion 521 at the ends of the recess 525.

The movement of the piezoelectric element 526 against the ends of the recess 525 as described above allows for the terminal ends of the first and second clamp arms 522, 523 to move closer together. In some embodiments, such movement of the terminal ends of the clamp arms 522, 523 in response to the expansion of the piezoelectric elements is based on the clamp arms 522, 523 being connected with the base portion 521 at flex points or hinges 127a, 127b. When the vertical guide post 156 is disposed in the opening 524, this movement together of terminal ends of clamp arms 522, 523 results in a clamping force being exerted against the vertical guide post 156 as shown in FIG. 7. As discussed in greater detail below, this clamping force allows for the brake assembly 158 to lock in place at any z position along the length of the vertical guide post 156.

In FIG. 6, the piezoelectric element 526 is in a non-activated (e.g., non-expanded) state. The piezoelectric element 526 resides against the base portion 521 at the ends of the recess 525 but does not push against the ends of the recess 525. As shown in the inset of FIG. 6, the terminal end of the clamp arm 522 is spaced apart from the vertical guide post 156 so as to not physically contact the vertical guide post 156. The overall dimensions of the clamp arms 522, 523 are designed such that the terminal ends of the first clamp arm 522 and the second clamp arm 523 do not push, contact or reside against the vertical guide post 156 when the vertical guide post 156 is disposed in the opening 524 and the piezoelectric element 526 is not activated. The clamp arms 522, 523 are connected to the base portion 521 via flex points 127a, 127b. The clamp arms 522, 523 are capable of bending/pivoting at the flex points 127a, 127b without breaking off from the base portion 521. The flex points 127a, 127b may be designed such that when no force is applied to the clamp arms 522, 523, they remain in the state shown in FIG. 6, for example, not touching or pushing against vertical guide post 156. The flex points 127a, 127b can therefore be considered to be biased towards the state shown in FIG. 6.

FIG. 7 illustrates how the clamp arms 522, 523 move when piezoelectric element 526 is activated and expands. More specifically, when the piezoelectric element 526 expands, it pushes against the base portion 521 at the ends of the recess 525. This outward movement of the base portion 521 causes the arms 522, 523 to effectively pivot inwardly at the flex points 127a, 127b, such that the terminal ends of the arms 522, 523 come closer together and push against the vertical guide post 156 as shown in the inset of FIG. 7. So long as the piezoelectric element 526 is activated, the arms 522, 523 remain pivoted inwardly and continue to exert clamping force on the vertical guide post 156. When the brake assembly 158 is stationary, this clamping force allows the brake assembly 158 to maintain an associated actuator arm 122 at a desired z position along vertical guide post 156. When the piezoelectric element 526 is deactivated, causing it to reduce in size and no longer push outwardly on the base portion 521, the bias of the flex points 127a, 127b results in the arms reverting back to the position shown in FIG. 6, thereby removing the clamping force from the vertical guide post 156. Thus, the brake assembly 158, which is fixed to actuator arm 122, is free to move up and down the vertical guide post 156 as the elevator 140 moves the actuator arm 122 in the z direction.

While FIGS. 6 and 7 illustrate an embodiment where the brake assembly 158 includes flex points 127a, 127b for purposes of allowing the terminal ends of the clamp arms 522, 523 to move together and exert a clamping force against the vertical guide post 156, it should be appreciated that other mechanisms for clamp arm movement to exert clamping force can also be used, such as springs, for example. In such an embodiment, the arms may move towards and away from the base portion, parallel to each other, without pivoting. In an embodiment where springs are used, the set of clamp arms may be designed and dimensioned such that the clamp arms exert a clamping force against the vertical guide post when the piezoelectric element is deactivated. When the piezoelectric element is activated, it expands in a similar fashion to the expansion described above with respect to FIG. 7. However, in this embodiment, the expansion of the piezoelectric element pushes the clamp arms away from the base portion. As the clamp arms are pushed away from the base portion, the terminal ends of the clamp arms disengage from the vertical guide post and thereby remove the clamping force from the vertical guide post. When the piezoelectric element is deactivated such that it reduces in size, the arms are pulled back towards the base portion via the springs. The springs recoil sufficiently to bring the clamp arms back towards the base portion and reapply clamping force to the vertical guide post.

FIGS. 5-7 generally illustrate an embodiment in which one piezoelectric element per pair of clamp arms is used. However, it should be appreciated that more than one piezoelectric element per pair of clamp arms can also be used in order to increase the range and type of clamp possible. Furthermore, when multiple piezoelectric elements are incorporated into a pair of clamp arms, the multiple piezoelectric elements may be identical in terms of their rate and type of expansion, or may be different types of piezoelectric elements such that each piezoelectric element provides a different type or degree of movement.

Figure 8A:
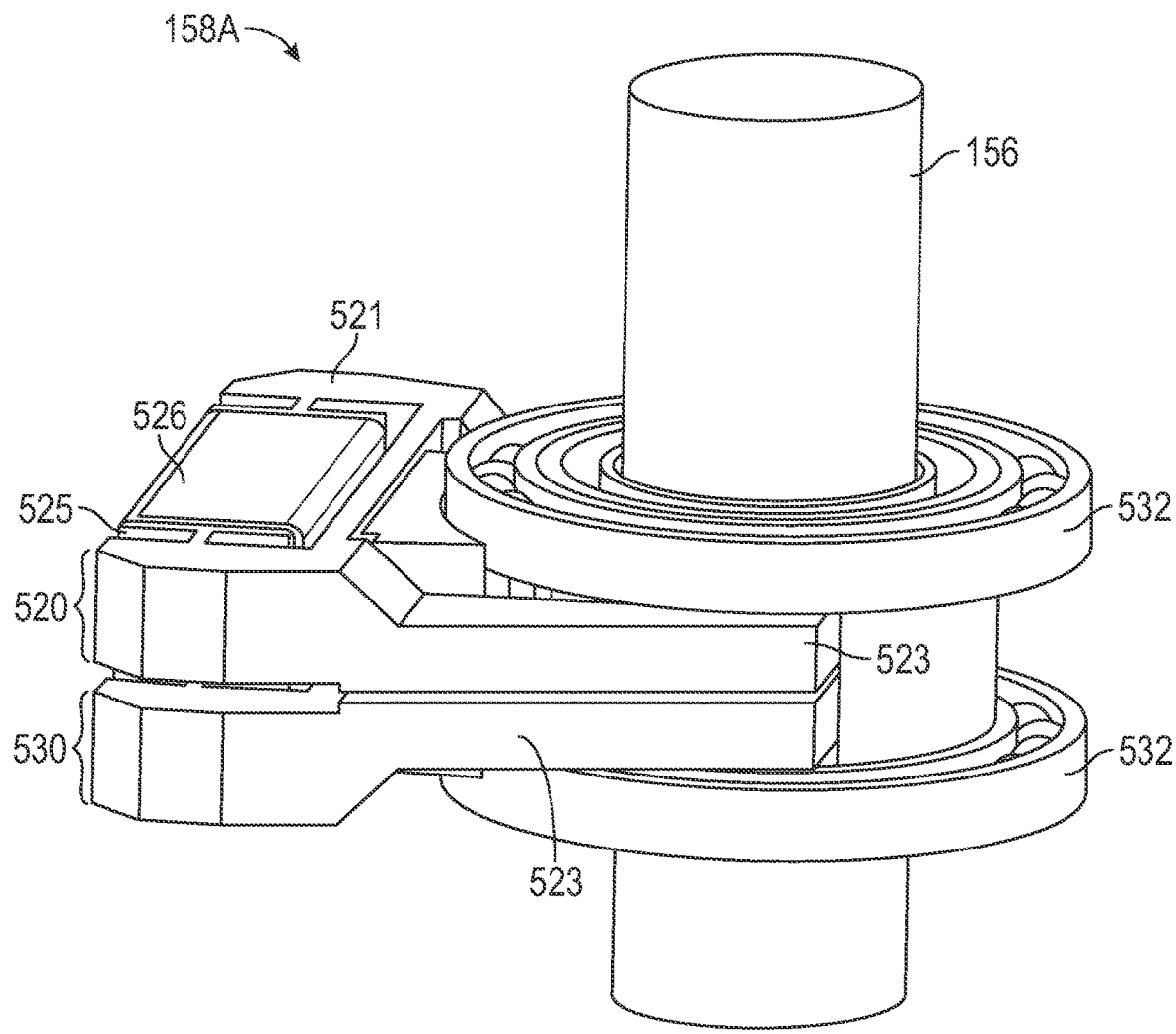
FIG. 8A is a perspective view of a brake crawler according to one aspect of the present disclosure.

As shown in FIGS. 5-7, brake assembly 158 can be used with any elevator 140 mechanism that moves an actuator arm up and down a guide post or shaft. In some embodiments, the brake assembly 158 is part of a crawler 158A that itself acts as an elevator, such as shown in FIGS. 2 and 4. FIG. 8A is a perspective view of a brake crawler 158A according to one aspect of the present disclosure. Although particular shapes of some elements look different in different embodiments (such as guide post 156, 256 clamp arms or assemblies 520, 522, 523, 530, or elevator 140, for example), it is to be understood that like reference numbers refer to like or analogous structures, and descriptions are applicable to all associated structures, even if there are differences in shape and design.

Brake crawler 158A may be used to move the actuator arm 122 up and down a vertical surface defined by the shaft 156 or stack block 400 in a precise manner such that each readable media disc in a stack of readable media can be accurately accessed by the arm 122 and read/write head 102 disposed at the terminal end of the arm 122. The brake crawler 158A described herein is also capable of locking or braking the arm 122 in place along the vertical surface of the shaft 156 or stack block 400 using the same mechanisms as are used for movement of the arm 122 in the Z-axis, thereby providing a simplified design with fewer parts. While the detailed description of various embodiments of the brake crawler 158A provided below focuses primarily on movement of an arm 122 within a hard disk drive 100, it should be appreciated that the brake crawler 158A can also be used for moving any other component of the hard disk drive that moves along an axis, and may also be used in connection with devices other than hard disk drives. Moreover, brake assemblies of other forms can be used with elevator 140.

Brake crawler 158A of FIGS. 8A-8D is shown in FIGS. 4, 15A-15D and can be used in place of brake assembly 158 of FIG. 5 to provide z direction motion as well as braking functions. The brake crawler 158A generally includes a first clamp arm assembly 520 and a second clamp arm assembly 530, the second clamp arm assembly 530 being disposed under or below the first clamp arm assembly 520. Each of the assemblies 520, 530 generally includes components as described above with reference to brake assembly 158. The clamp assemblies 520, 530 are movable on guide post 156 or stack block 400 between or along cylindrical sliders 532, columns 406, or posts that include bearings, more example.

With two clamp assemblies 520, 530, an inch-worm type of movement of the brake crawler 158A is provided up or down the shaft 156 or stack block 400. Regardless of the specific manner in which the clamp arms move (e.g., via flex points or via spring attachments), various combinations of piezoelectric elements can be used in the brake crawler 158A to achieve different effects. In some embodiments, the piezoelectric elements in the first and second set of clamp arms are similar or identical with respect to their rate of expansion when activated such that both sets of clamp arms 520, 530 exert similar or identical clamping forces on the shaft 156 or stack block 400. In other embodiments, one of the two piezoelectric elements 526 is designed to expand more than the other, such that the clamp arms associated with the piezoelectric element that expands more exerts more force on the shaft 156 or stack block 400 when the piezoelectric element is activated than the other clamp arms. Such a configuration may be useful where one set of clamp arms is desired to be the primary braking/locking mechanism when it is desired to hold the associated arm assembly in place along the length of the shaft 156 or stack block 400. In such configurations, the other set of clamp arms may serve only a supplemental or secondary braking/locking function, or may not be used for braking/locking at all. However, regardless of the difference in clamping force exerted based on the different piezoelectric elements used, both sets of clamping arms should be designed to apply some clamping force against the shaft in order to carry out the inch-worm movement of the brake crawler 158A up and down the shaft 156 or stack block 400.

Figure 8B:
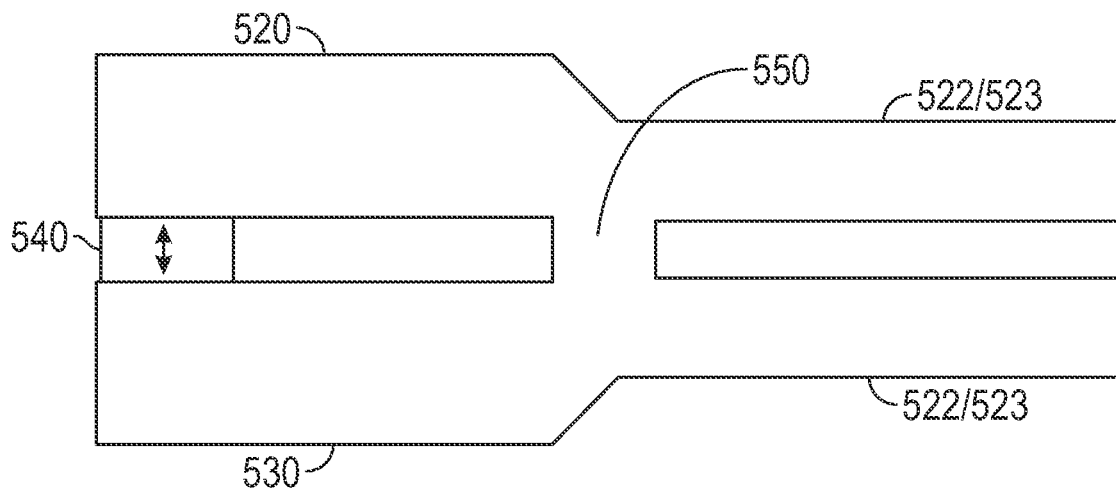
FIGS. 8B and 8C present side views of the brake crawler of FIG. 8A.

As shown in FIG. 8B, which is a simplified side view of the brake crawler 158A, the first clamp arm assembly 520 and the second clamp arm assembly 530 are aligned essentially parallel to one another such that the terminal ends of the clamp arms 522, 523 are close together. This orientation is achieved when the third piezoelectric element 540 is activated and has expanded in at least the vertical direction to cause the first clamp arm assembly 520 and the second clamp arm assembly 530 to flex at pivot point 550 towards each other at the terminal ends of the clamp arms. In this embodiment, the pivot point 550 is biased toward the position shown in FIG. 8C, such that when the third piezoelectric element 540 is deactivated and reduces in size in the vertical direction, the terminal ends of the first clamp arm assembly 520 and the second clamp arm assembly 530 move away from each other by virtue of the first clamp arm assembly 520 and the second clamp arm assembly 530 pivoting outwardly at the flex point 550 until the flex point 550 reaches its bias position. In the default position of FIG. 8C, the terminal ends of the clamp arms 522, 523 of each of the first clamp arm assembly 520 and the second clamp arm assembly 530 are farther away from each other than in FIG. 8B.

Figure 8C:
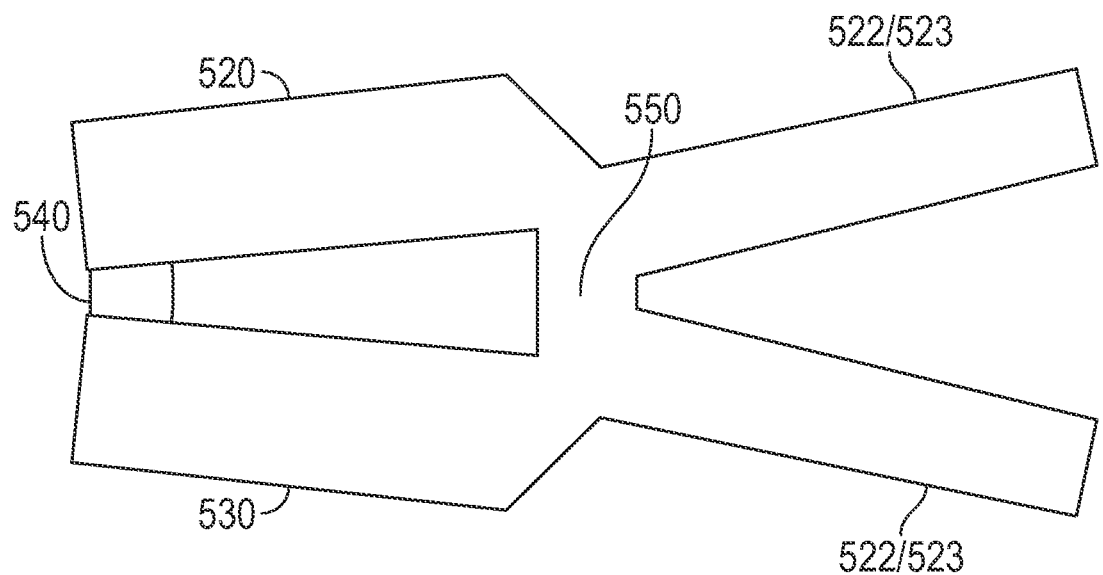

While FIGS. 8B and 8C illustrate using one piezoelectric element 540 for increasing and decreasing the distance between the first set of clamp arms and the second set of clamp arms in the Z-direction at one end of the clamp arms, it should be appreciated that more than one piezoelectric element can be located between the first set of clamp arms and the second set of clamp arms to provide additional functionality. Additionally, the one or more piezoelectric elements located between the first set of clamp arms and the second set of clamp arms may be configured to allow for various separation distances between the first and second set of clamp arms. In some embodiments, the amount of expansion or contraction of the piezoelectric element 540 positioned between the first and second set of clamp arms is controllable to allow for various intermediate spacings between the first and second set of clamp arms, rather than just allowing for full expansion and full contraction, which would only permit for two terminal distances between the first and second set of clamp arms.

The ability of each of the first and second sets of clamp arms 520, 530 of the brake crawler 158A to independently exert and release a clamp force on the shaft 156 or stack block 400, and the ability to increase and decrease the distance between the terminal ends of the clamp arms of first clamp arm assembly 520 and the second clamp arm assembly 530, allow the brake crawler 158A to move up and down the shaft 156 or stack block 400 using an inch-worm sequence of movements. When an arm 122 is associated with the brake crawler 158A, this allows for the brake crawler 158A to move the arm 122 up and down the shaft 156 or stack block 400 to thereby align with and access any of the vertically stacked readable media discs 104.

Figure 8D:
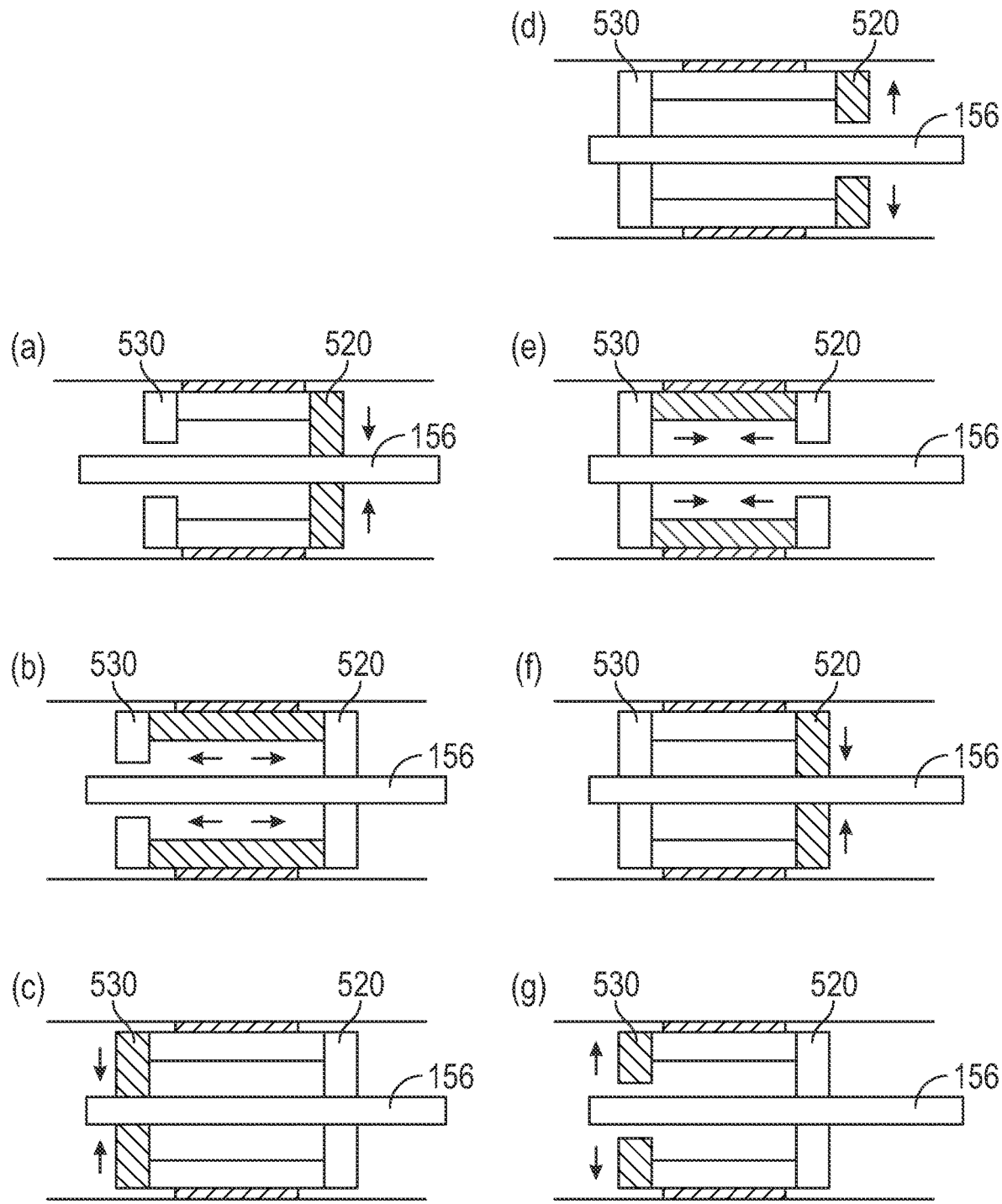
FIG. 8D presents an illustration of a sequence of movements for the brake crawler to perform inch worm movement along a shaft according to one aspect of the present disclosure.

FIG. 8D illustrates the sequence of movements that can be carried out to perform this inch worm type movement of the brake crawler 158A. In this figure, the components are not drawn to scale, and the z direction is illustrated as horizontal, with the "up" direction to the right. At (a), the brake crawler is oriented such that the first clamp arm assembly 520 is engaged with and exerting a force against the shaft 156 or stack block 400, while the second clamp arm assembly 530 is disengaged from the shaft 156 or stack block 400. In some embodiments, this may be accomplished by activating the piezoelectric element 526 in the recess of the base of the first clamp arm assembly 520 and deactivating the piezoelectric element 526 in the recess of the base of the second clamp arm assembly 530 (such as when a pivot configuration as shown in FIGS. 5-8C is used), or vice versa (such as when a spring loaded configuration described above is used). At (a), a piezoelectric element 540 (labeled in FIGS. 8B and 8C) located between the first clamp arm assembly 520 and the second clamp arm assembly 530 is in whichever state causes the terminal ends of the clamp arms to be closest together (such as activated when using the configuration shown in FIGS. 5-8C, or deactivated when using a spring loaded the configuration).

At (b), the state of the piezoelectric element 540 located between the first clamp arm assembly 520 and the second clamp arm assembly 530 is changed from its state in (a) so that the terminal ends of each of set of the clamp arms move away from each other, as shown in FIG. 8C. The first clamp arm assembly 520 remains engaged with the shaft 156 or stack block 400 and the second clamp arm assembly 530 remains disengaged with the shaft 156 or stack block 400 during (b). At (c), the state of the piezoelectric element 526 associated with the second clamp arm assembly 530 is changed from its state in (a) so that the clamp arms of the second clamp arm assembly 530 engage with and exert a force against the shaft 156 or stack block 400. The first clamp arm assembly 520 remains engaged with the shaft 156 or stack block 400 and the first clamp arm assembly 520 remains distanced away from the second clamp arm assembly 530 during (c). At (d), the piezoelectric element 526 associated with the first clamp arm assembly 520 is changed such that the first clamp arm assembly 520 disengages from the shaft 156 or stack block 400. The second clamp arm assembly 530 remains engaged with the shaft 156 or stack block 400 and the first clamp arm assembly 520 remains distanced away from the second clamp arm assembly 530 during (d). At (e), the piezoelectric element 540 located between the first clamp arm assembly 520 and the second clamp arm assembly 530 is changed so that the first clamp arm assembly 520 moves closer to the second clamp arm assembly 530. The first clamp arm assembly 520 remains disengaged with the shaft 156 or stack block 400 and the second clamp arm assembly 530 remains engaged with the shaft 156 or stack block 400 during (e).

At (f), the piezoelectric element 526 associated with the first clamp arm assembly 520 is changed so that the first clamp arm assembly 520 exerts a force against the shaft 156 or stack block 400. The second clamp arm assembly 530 remain engaged with the shaft 156 or stack block 400 and the first clamp arm assembly 520 and the second clamp arm assembly 530 remain close together during (f). At this point in the sequence of movements, the brake crawler 158A has now moved down the shaft 156 or stack block 400 (to the left as illustrated), as the first clamp arm assembly 520 is now engaged with the shaft 156 or stack block 400 at a lower position on the shaft or stack block than as shown in (a). At (g), the piezoelectric element associated with the second clamp arm assembly 530 is changed to release the second clamp arm assembly 530 from the shaft, and the configuration of the brake crawler 158A has reverted back to the configuration of (a), such that the sequence of movements (a)-(f) can be repeated to continue to move the brake crawler 158A down the shaft 156 or stack block 400.

The sequence of movements described above with respect to FIG. 8D can be reversed in order to move the brake crawler 158A up the shaft 156 or stack block 400. Additionally, the incremental movement of the brake crawler 158A either up or down the shaft 156 or stack block 400 via this sequence of motion allows for precise placement and location of the brake crawler 158A along the shaft 156 or stack block 400, which allows for accurate alignment of the brake crawler 158A and associated arm 122 with the desired readable media disc 104 in the vertical stack.

FIG. 9 is a perspective view of a data storage device 100B with a second embodiment of a zero skew elevator system. Data storage device 100B uses a linear actuator assembly 220. Linear actuator assembly 220 allows for zero skew (or fixed skew) throughout the entire stroke of the head stack assembly 138B. This allows for increased density of a data storage compared to a device with a rotating arm 122. For example, by configuring the slider to have zero skew throughout the entire stroke of the head 102 at head end 142 of HSA 138B, the head 102 may be able to read data immediately after writing the data. In contrast, in a conventional skewed configuration, the angle of the head 102 relative to the data track 114 (e.g., the stroke extending along an arc 130) may not allow for this immediate reading after writing. Thus, a head 102 using a linear actuator to move the head 102 linearly through the stroke may help to accomplish this task. As shown in FIG. 9, in a zero skew configuration, the read and/or write pole at head 102, on head end 142, moves linearly along radius 218 and is therefore positioned with no skew or angular offset to a centerline of a track 114.

Figure 11:
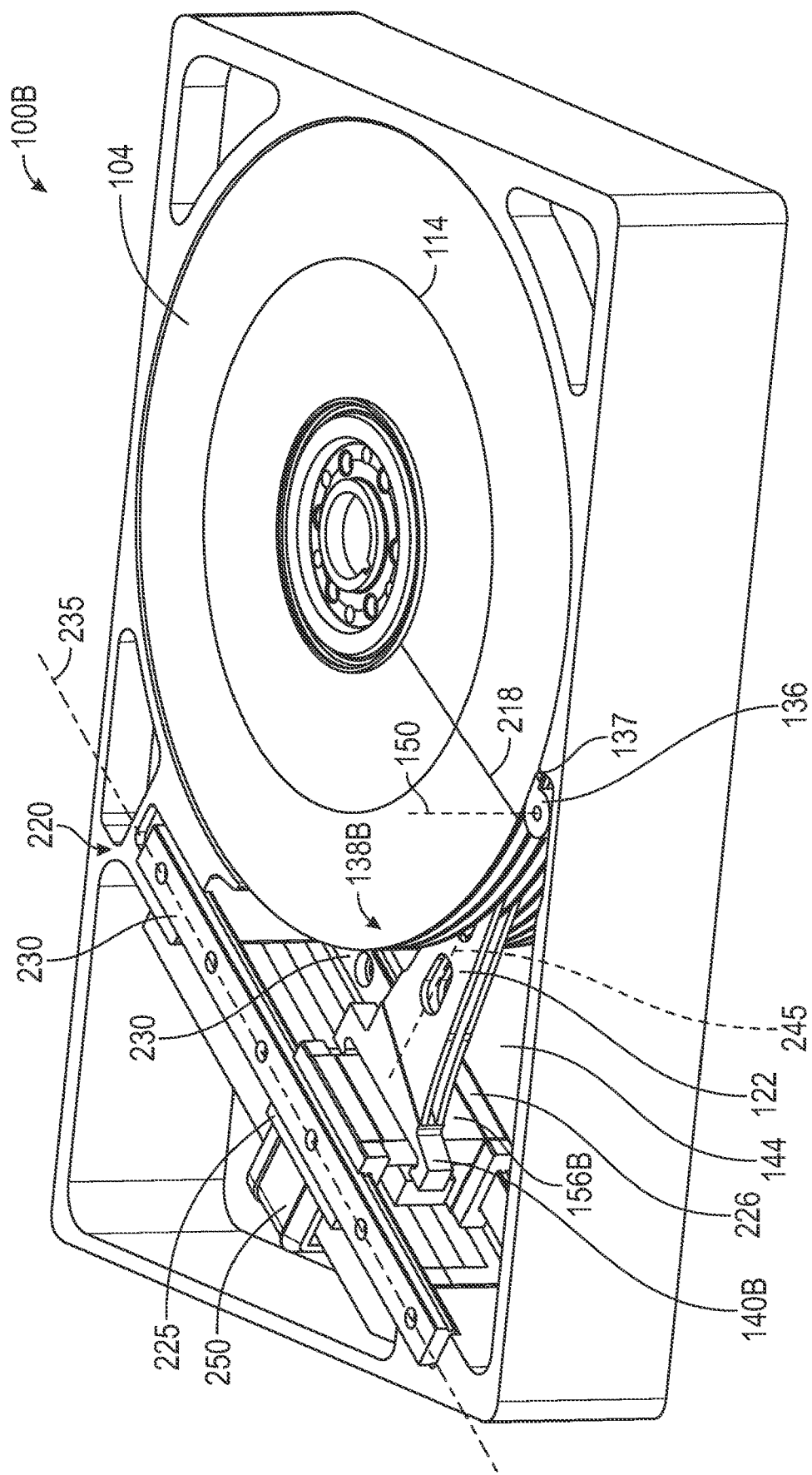
FIG. 11 is a perspective view of the data storage device of FIG. 9, with the actuator arm in a third position.

FIGS. 9-11 illustrate an exemplary device 100B (for example, a data storage device) including a linear actuator assembly 220. The linear actuator assembly 220 of the data storage device 100B may include one or more rails 230 extending along a rail axis 235 (or a parallel rail axis in the case of more than one rail 230). In an exemplary embodiment, rail axis 235 is parallel to radius 218 of disc 104 on which the head travels. The rails 230 may define any suitable cross-sectional shape, such as square, rectangular, circular, or oval, for example. Further, the rails 230 may include or be formed of any suitable material, such as stainless steel, or titanium, for example.

Linear actuator assembly 220 includes an actuator arm 122 extending along an arm axis 245 that is normal to both the rail axis 235 and the disc radius 218. The actuator arm 122 includes at least one head 102 for reading and writing data from and to the recording medium 104. The at least one head 102 is located at the distal head end 142 of the actuator arm 122. The actuator arm 122 is movably attached to the rails 230 such that motion in the x-y plane is restricted to sliding motion along the rails 230. In other words, the actuator arm 122 may be movably attached to the rails 230 so that the actuator arm 122 moves linearly and, therefore, the at least one head 102 also moves linearly relative to the recording medium 104, along radius 218. In the illustrated embodiment, head support ramp 136 is a rotary ramp in which ramp edge 137 can be pivoted about axis 150 on and off disc 104. In some illustrations, a movable ramp portion 136b (such as vertically movable in unison with elevator 140) is not visible but may be used with any embodiment of a disc storage device.

In an exemplary embodiment, the actuator arm 122 is movably coupled to the rails 230 via elevator 140B which is in turn mounted on or more sliding brackets 225, 226. As illustrated, top sliding bracket 225 is movably attached to the top rail 230 and a bottom sliding bracket 226 is movably attached to the bottom rail 230. However, in one or more embodiments, the device 100 may include any number of rails and sliding brackets movably attaching the elevator 140B to the rails 230.

As shown in a comparison of FIGS. 9 and 11, the actuator arm 122 is coupled to elevator 140B in a way that allows z direction motion of the actuator arm 122 relative to the stack of recording media, so that the head end 142 of HSA 138B can access different discs 104 of the stack. Exemplary drivers for Z direction motion of elevator 140B include a ball screw with an internal motor, a voice coil motor, an inchworm style brake crawler, a linear motor, a shape memory alloy based actuator, and a combination of the above. By restricting motion of the actuator arm 122 to x-y plane movement only parallel to rail axis 235, and by restricting motion of the actuator arm 122 to z plane movement only normal to the x-y motion, this arrangement stabilizes the actuator arm 122 even while allowing it to reach any desired position on the recording media. In other words, the actuator arm 122 is prevented from moving in other rotational or directional ways (such as tilting, for example).

In an exemplary embodiment, the linear actuator assembly 220 of the data storage device 100B includes a linear motor 250 adapted to move the elevator 140B and its connected actuator arm 122 relative to the rails 230. The linear motor 250 may include any suitable type of motor that moves the actuator arm 122 linearly along the rails 230. For example, the linear motor 250 may include a linear stepper motor, a piezoelectric inchworm motor, a linear voice coil motor, ball screw and gear motor, for example.

In a case in which the linear motor 250 includes a linear stepper motor, a permanent alternating magnet is fixed to a drive base extending parallel to the rails 230. For example, the permanent alternating magnet may alternate polarities along a length of the permanent alternating magnet. The elevator 140B may include two or more dynamic magnets (e.g., electromagnets) that interact with the permanent alternating magnet. For example, the device 100B may send a signal to the dynamic magnets to change polarity (such as to switch on and off) so that the dynamic magnets on the elevator 140B move along the permanent alternating magnet extending along and between rails 230 due to attractive and repellant forces formed therebetween.

In another case in which the linear motor 250 includes a piezoelectric inchworm motor, a crawler similar to that described above with respect to brake crawler 158A can be attached to elevator 140B, to move horizontally along one or more of the rails 230, or to move horizontally along a drive base or shaft extending parallel to the rails 230.

In yet another case, the linear motor 250 includes a linear voice coil motor having a permanent alternating magnet fixed to a drive base extending parallel to the rails 230. For example, the permanent alternating magnet may alternate polarities along a length of the permanent alternating magnet. Brackets 225, 226 are attached to a voice coil that interacts with the permanent alternating magnet. For example, the device 100B may send a signal to the voice coil to change polarity such that the voice coil moves along the permanent alternating magnet due to attractive and repellant forces formed therebetween. Furthermore, the voice coil may encircle the permanent alternating magnet. In another embodiment, the permanent alternating magnet and the voice coil may be in a different arrangement than described.

Whatever mechanism is used in linear motor 250, its motion moves brackets 225, 226 along rails 230. The brackets 225, 226 are attached to elevator 140B, which in turn carries actuator arm 122. Accordingly, activation of linear motor 250 causes actuator arm 122 and its head 102 to move linearly with the brackets 225, 226 along rails 230. As such, as shown in a comparison between FIGS. 9 and 10, the at least one head 102 positioned on the distal end 142 of the actuator arm 122 moves in a straight line radially on the recording medium 104. Thus, for the entire stroke of motion along radius 218, no skew is introduced between the head 102 and a disc track, of which one track 114 is an example.

As shown in FIG. 9, when the head end 142 of actuator arm 122 rests on ramp 136, in an embodiment in which ramp 136 is movable vertically, elevator 140B is actuated to move actuator arm 122 vertically up and down the stack of discs 104. FIG. 11 shows a configuration in which the elevator 140B has lowered actuator arm 122 in the z direction, and linear motor 250 has also moved actuator arm 122 along rails 230 so that the read/write head can access a track on a lower disc of the stack.

FIGS. 12A-12D are perspective views of a data storage device 100C with a third embodiment of a zero skew elevator system. Because the elevator 140C is does not move linearly with the actuator arm 122, there is less load on the linear driver or motor 250 than in the device 100B. Moreover, there is less concern about weight of the elevator 140C, so it can be relatively robust. Additionally, in the case where the ramp 136 has a movable ramp portion 136b, the elevator 140C can be operationally connected to move both the actuator arm 122 and the movable ramp portion 136b in unison.

Figure 12A:
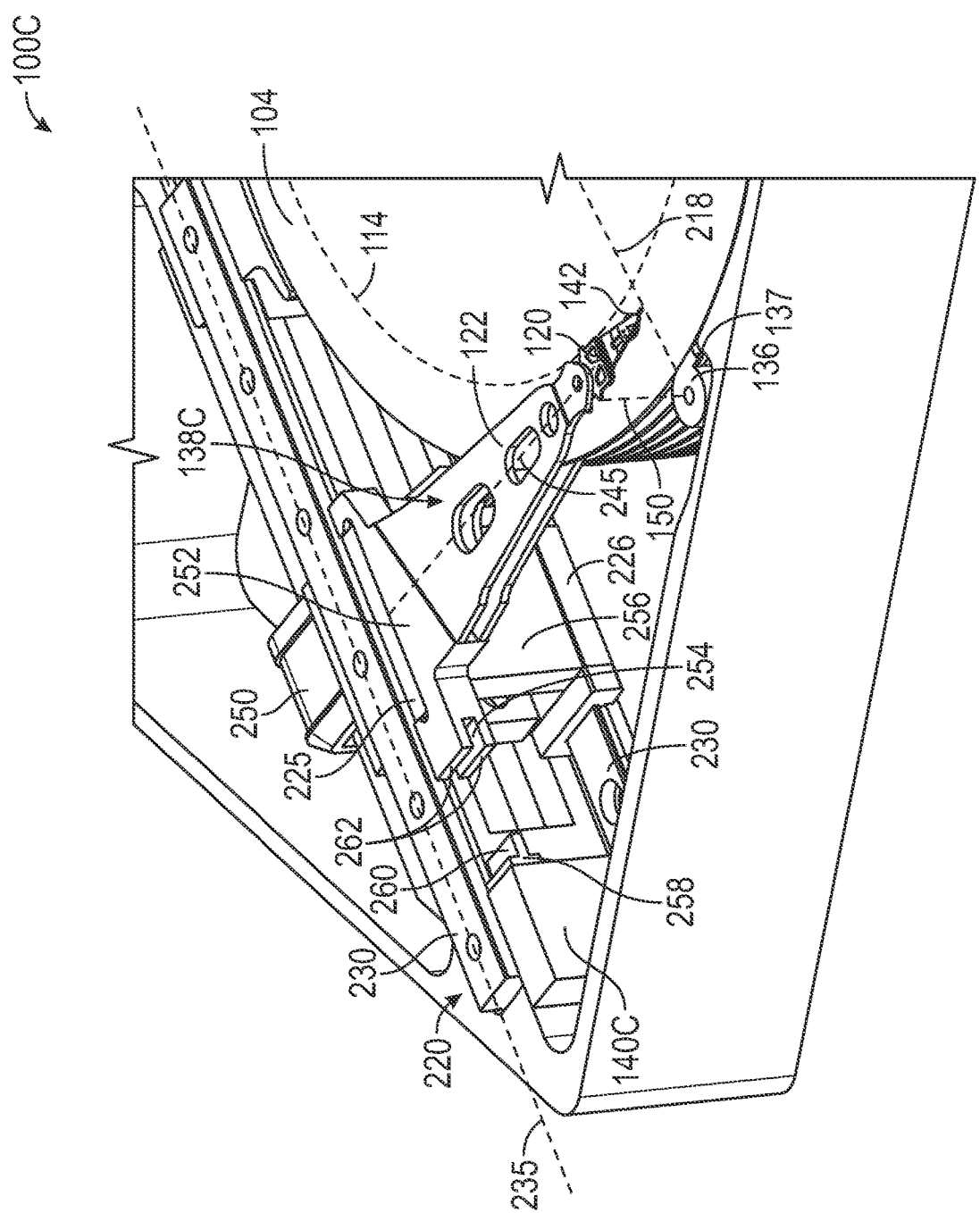
FIG. 12A is a perspective view of a data storage device with a third embodiment of a zero skew elevator system, wherein the actuator arm is in a raised position over the disc.
Figure 12B:
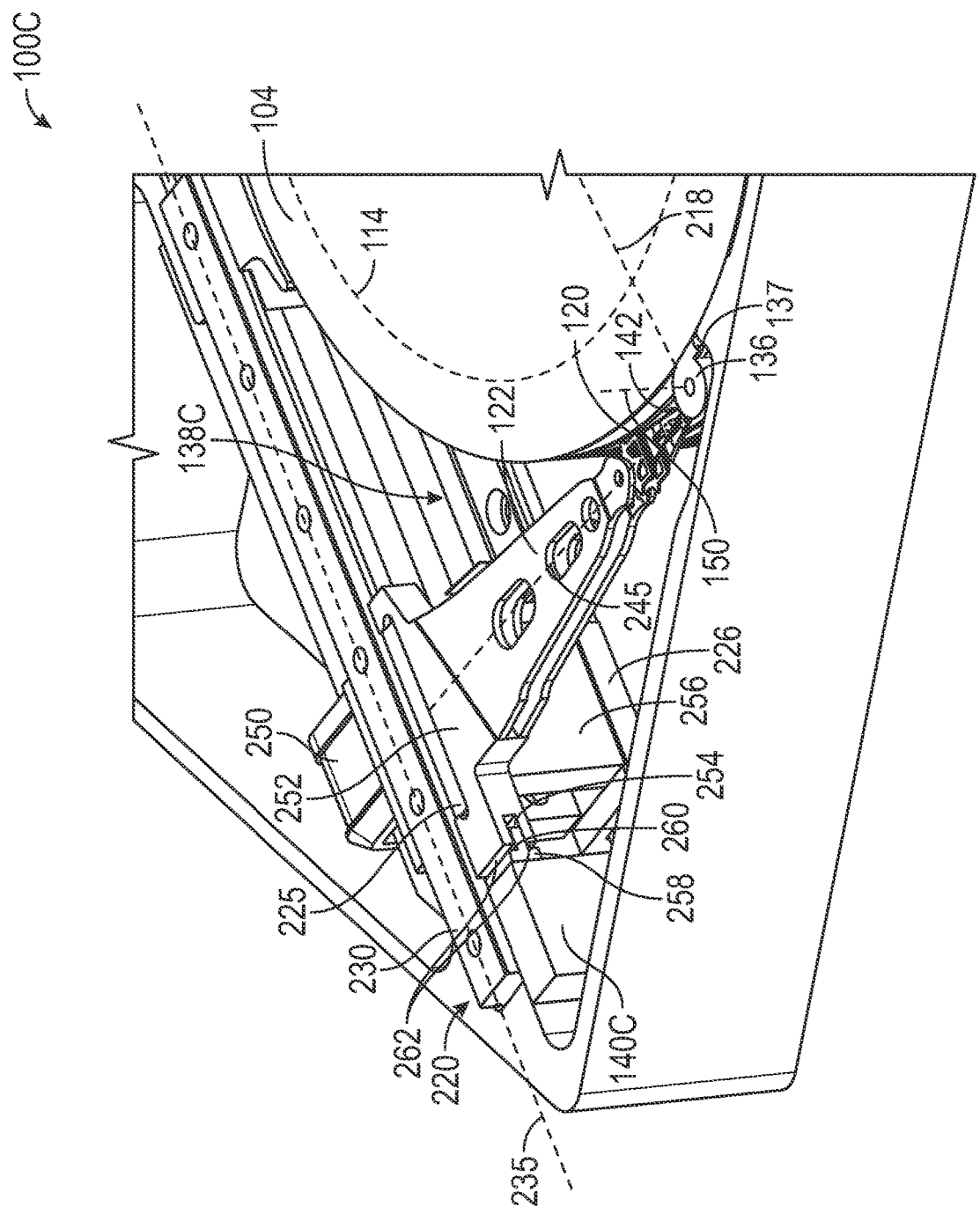
FIG. 12B is a perspective view of the data storage device with the third embodiment of a zero skew elevator system, wherein the actuator arm is in a raised position off the disc.

FIG. 12A shows data storage device 100C wherein the actuator arm 122 is in a raised position, and wherein it has slid linearly along rails 230 to a position that places head end 142 of HSA 138C over the disc 104. FIG. 12B shows the actuator arm 122 in a raised position, wherein the head end 142 of HSA 138C is off the disc 104 and rests on ramp 136. A vertical guide 256 extends between the top sliding bracket 225 and the bottom sliding bracket 226 of linear actuator assembly 220. Coupler bracket 252 connects actuator arm 122 to the vertical guide 256 in a manner that allows the coupler bracket 252, and in turn the actuator arm 122, to move up and down the vertical guide 256 in the z direction. Coupler bracket 252 is selectively engageable with elevator 140C. In the illustrated embodiment, coupler bracket 252 includes a cleft or recess 254 between flanges 262. Elevator bracket 258, which moves up and down by motive of elevator 140C, has a complementary projection 260. As shown in FIG. 12B, coupler bracket 252 engages with elevator bracket 258 by insertion of projection 260 into recess 254. While a particular bracket configuration is illustrated and described, it is contemplated that other coupling mechanisms such as clamps can also be used. The selective coupling and uncoupling of elevator 140C and arm 122 is also referred to as "clamping," though no forceful frictional engagement may be involved.

Figure 12C:
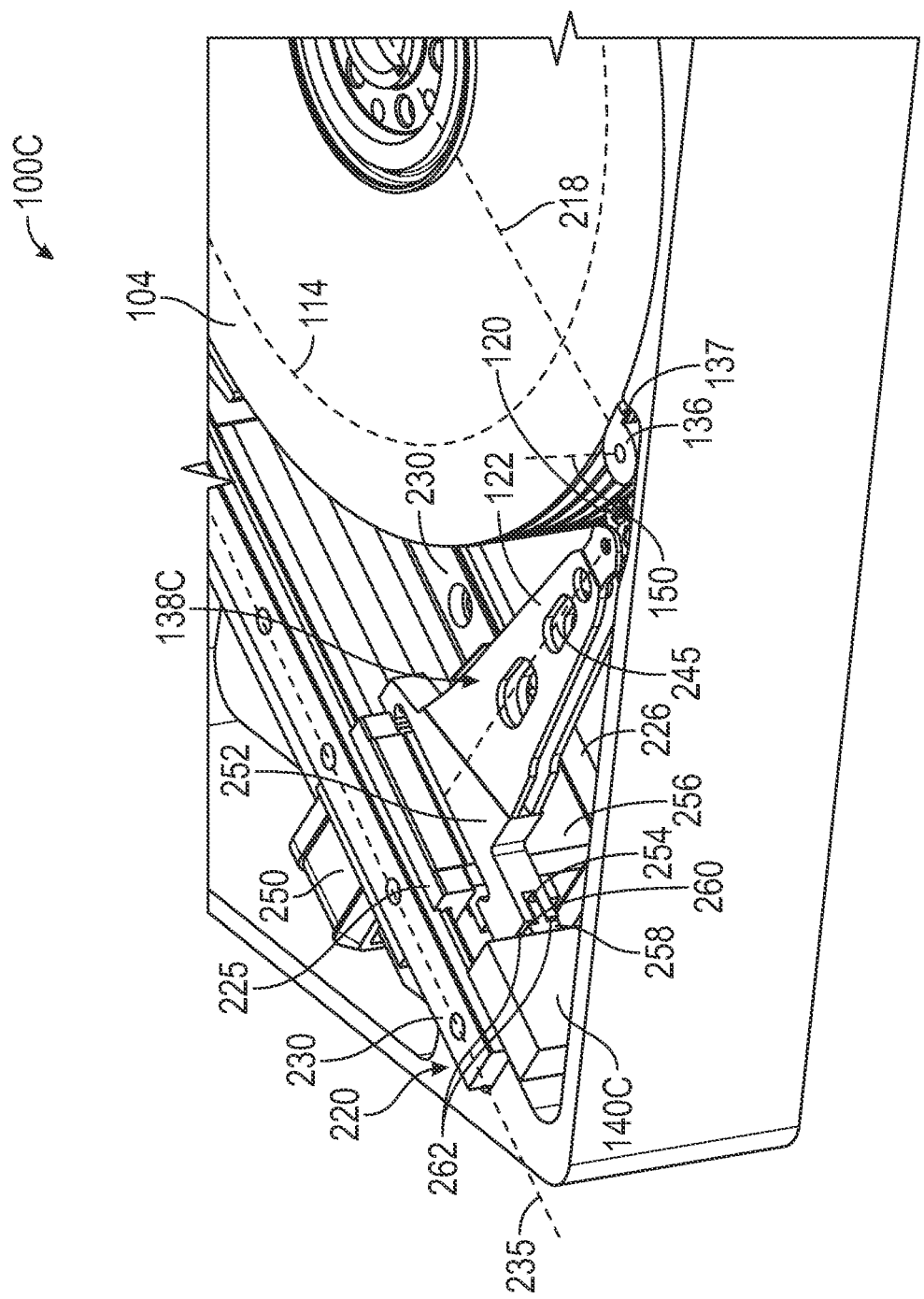
FIG. 12C is a perspective view of the data storage device with the third embodiment of a zero skew elevator system, wherein the actuator arm is in a lowered position off the disc.
Figure 12D:
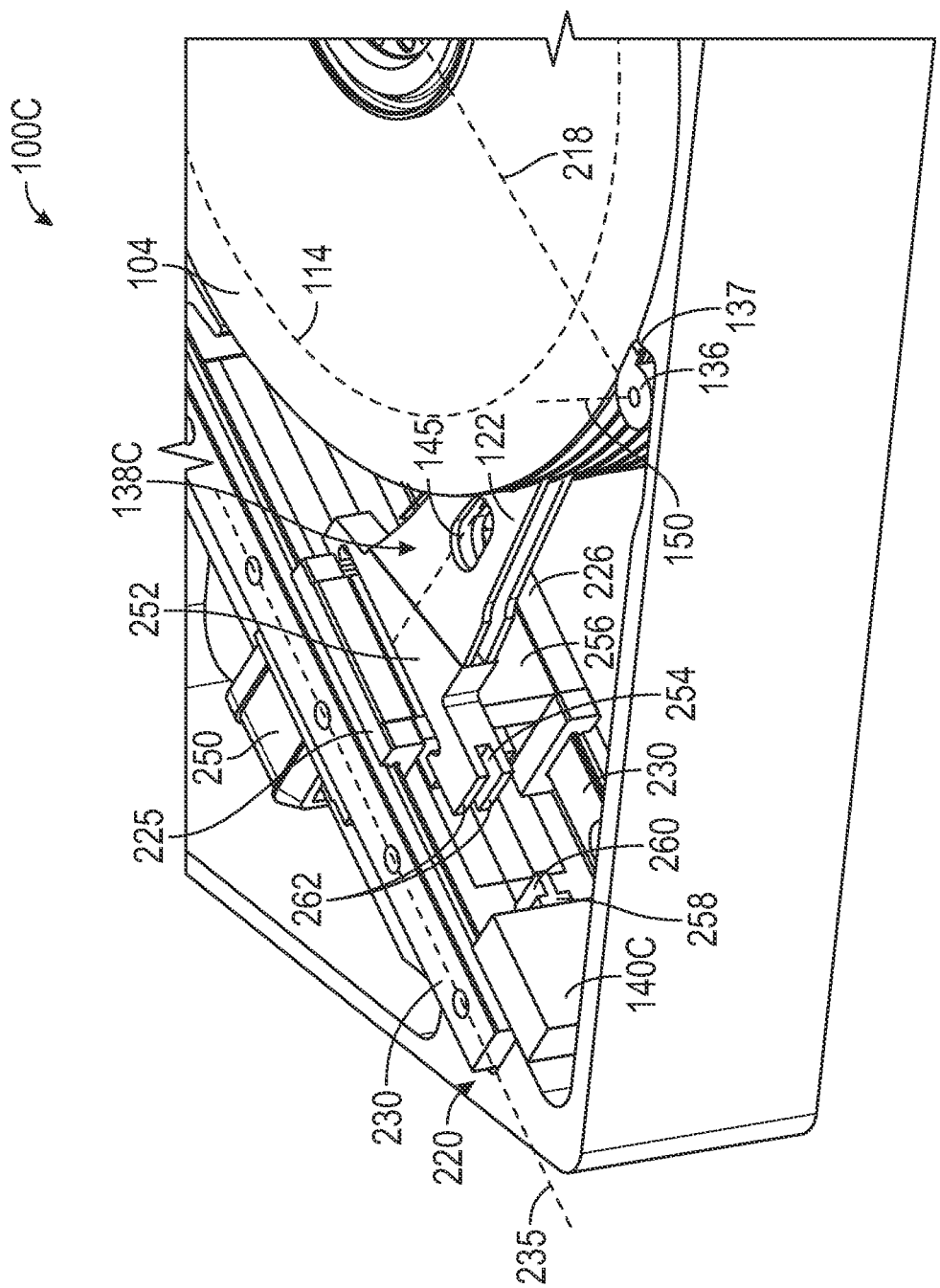
FIG. 12D is a perspective view of the data storage device with the third embodiment of a zero skew elevator system, wherein the actuator arm is in a lowered position on the disc.

As shown in FIG. 12C, with the brackets 252, 258 thus physically connected, activation of elevator 140C to lower or raise elevator bracket 258 also lowers or raises the coupled bracket 252 and the attached actuator arm 122. Thus, the head end 142 of HSA 138C can be moved up and down in the z direction to access different discs 104 in the disc stack using an elevator 140C that is only connected to the actuator arm 122 when needed to affect the vertical motion of the arm 122. When the actuator arm 122 has reached the desired vertical position, any type of braking mechanism can be used to hold the coupler bracket 252 in the desired vertical position on vertical guide 256. Then, the linear motor 250 is activated, as shown in FIG. 12D, to move the brackets 225, 226 and vertical guide 256 along rails 230. This x-y motion thereby disengages the recess 254 from projection 260 and allows the actuator arm 122 to slide between lower discs in the stack to allow the head end 142 to read/write a desired track. While particular coupling mechanisms are described for selectively engaging and disengaging actuator arm 122 to and from elevator 140C, it is to be understood that other mechanical, magnetic, electromagnetic, and other forms of physical connection and disconnection can be used.

In many respects, device 100C is similar to device 100B, and descriptions relevant to both devices apply to both devices. For example, linear actuator assembly 220 allows for zero skew (or fixed skew) throughout the entire stroke of the head stack assembly 138C. As shown in FIG. 12A, in a zero skew configuration, the read and/or write pole of a transducer on head end 142 of HSA 138C, moves linearly along radius 218 and is therefore positioned with no skew or angular offset to a centerline of a track 114.

Linear actuator assembly 220 of the data storage device 100C may include one or more rails 230 extending along a rail axis 235 (or a parallel rail axis in the case of more than one rail 230). In an exemplary embodiment, rail axis 235 is parallel to radius 218 of disc 104 on which the head travels. The rails 230 may define any suitable cross-sectional shape, such as square, rectangular, circular, or oval, for example. Further, the rails 230 may include or be formed of any suitable material, such as stainless steel, or titanium, for example.

Linear actuator assembly 220 includes an actuator arm 122 extending along an arm axis 245 that is normal to both the rail axis 235 and the disc radius 218. The actuator arm 122 includes at least one head for reading and writing data from and to the recording medium 104. The at least one head is located at the distal head end 142 of the actuator arm 122. The actuator arm 122 is movably attached to the rails 230 such that motion in the x-y plane is restricted to sliding motion along the rails 230. In other words, the actuator arm 122 may be movably attached to the rails 230 so that the actuator arm 122 moves linearly and, therefore, the at least one head 102 also moves linearly relative to the recording medium 104, along radius 218. In the illustrated embodiment, head support ramp 136 is a rotary ramp in which ramp edge 137 can be pivoted about axis 150 on and off disc 104. In some illustrations, a movable ramp portion 136b (such as vertically movable in unison with elevator 140) is not visible but may be used with any embodiment of a disc storage device.

As illustrated, top sliding bracket 225 is movably attached to the top rail 230 and a bottom sliding bracket 226 is movably attached to the bottom rail 230. However, in one or more embodiments, the device 100 may include any number of rails and sliding brackets movably attaching the vertical guide 256 to the rails 230.

Exemplary drivers for Z direction motion of elevator 140C include a ball screw with an internal motor, a voice coil motor, an inchworm style brake crawler, a linear motor, a shape memory alloy based actuator, and a combination of the above. By restricting motion of the actuator arm 122 to x-y plane movement only parallel to rail axis 235, and by restricting motion of the actuator arm 122 to z plane movement only normal to the x-y motion, this arrangement stabilizes the actuator arm 122 even while allowing it to reach any desired position on the recording media. In other words, the actuator arm 122 is prevented from moving in other rotational or directional ways (such as tilting, for example).

In an exemplary embodiment, the linear actuator assembly 220 of the data storage device 100C includes a linear motor 250 adapted to move the actuator arm 122 relative to the rails 230. The linear motor 250 may include any suitable type of motor that moves the actuator arm 122 linearly along the rails 230. For example, the linear motor 250 may include a linear stepper motor, a piezoelectric inchworm motor, a linear voice coil motor, ball screw and gear motor, for example.

In a case in which the linear motor 250 includes a linear stepper motor, a permanent alternating magnet is fixed to a drive base extending parallel to the rails 230. For example, the permanent alternating magnet may alternate polarities along a length of the permanent alternating magnet. The vertical guide 256 may include two or more dynamic magnets (e.g., electromagnets) that interact with the permanent alternating magnet. For example, the device 100C may send a signal to the dynamic magnets to change polarity (such as to switch on and off) so that the dynamic magnets on the vertical guide 256 move along the permanent alternating magnet extending along and between rails 230 due to attractive and repellant forces formed therebetween.

In another case in which the linear motor 250 includes a piezoelectric inchworm motor, a crawler similar to that described above with respect to brake crawler 158A can be attached to vertical guide 256, to move horizontally along one or more of the rails 230, or to move horizontally along a drive base or shaft extending parallel to the rails 230.

In yet another case, the linear motor 250 includes a linear voice coil motor having a permanent alternating magnet fixed to a drive base extending parallel to the rails 230. For example, the permanent alternating magnet may alternate polarities along a length of the permanent alternating magnet. Brackets 225, 226 are attached to a voice coil that interacts with the permanent alternating magnet. For example, the device 100C may send a signal to the voice coil to change polarity such that the voice coil moves along the permanent alternating magnet due to attractive and repellant forces formed therebetween. Furthermore, the voice coil may encircle the permanent alternating magnet. In another embodiment, the permanent alternating magnet and the voice coil may be in a different arrangement than described.

Whatever mechanism is used in linear motor 250, its motion moves brackets 225, 226 along rails 230. The brackets 225, 226 are attached to vertical guide 256, which in turn carries actuator arm 122. Accordingly, activation of linear motor 250 causes actuator arm 122 and its head to move linearly with the brackets 225, 226 along rails 230. As such, the at least one head positioned on the distal end 142 of the actuator arm 122 moves in a straight line radially on the recording medium 104. Thus, for the entire stroke of motion along radius 218, no skew is introduced between the head 102 and a disc track, of which one track 114 is an example.

As shown in FIG. 12B, when the head end 142 of actuator arm 122 rests on ramp 136, in an embodiment in which at least a portion of ramp 136 is movable vertically, elevator 140C is actuated to move actuator arm 122 vertically up and down the stack of discs 104. At least a portion of ramp 136 is operably connected to elevator 140C (directly or indirectly by attachment to arm 122) to move in unison with elevator bracket 258. FIG. 12D shows a configuration in which the elevator 140C has lowered actuator arm 122 in the z direction, and linear motor 250 has also moved actuator arm 122 along rails 230 so that the read/write head can access a track on a lower disc of the stack.

Figure 13A:
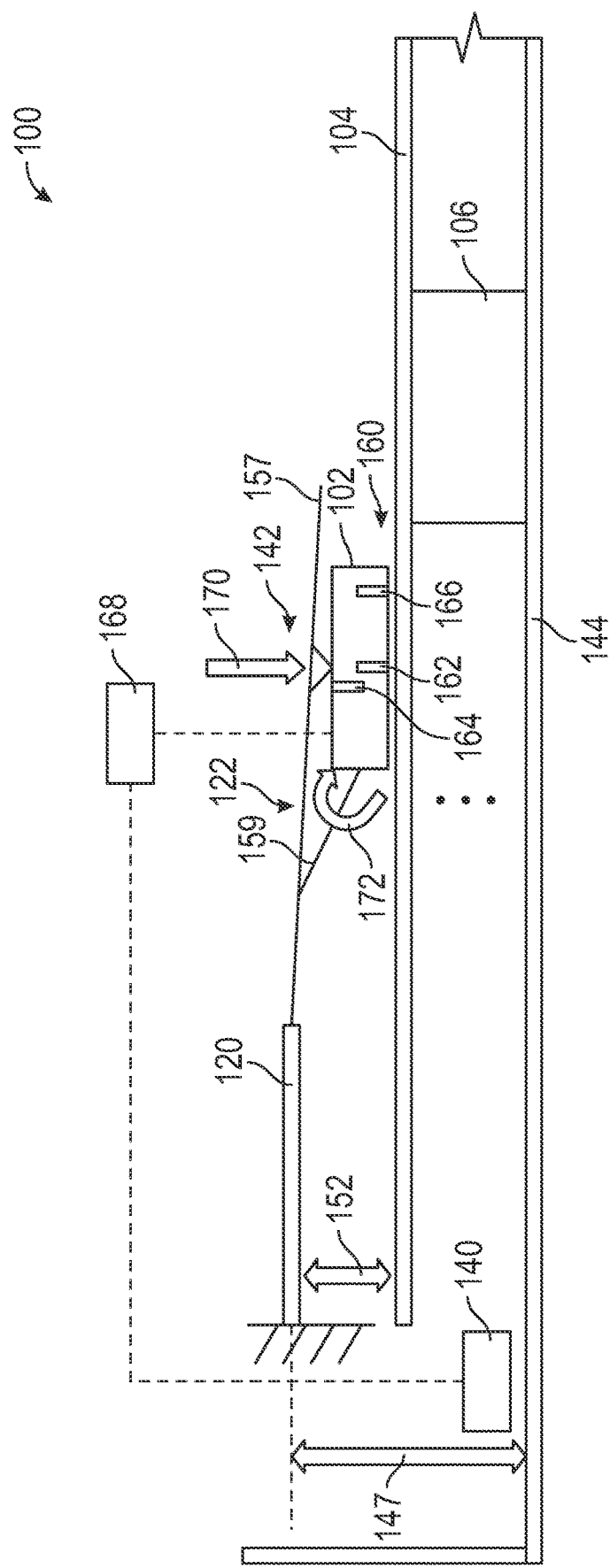
FIG. 13A is a side schematic illustration of a portion of a data storage device.
Figure 13B:
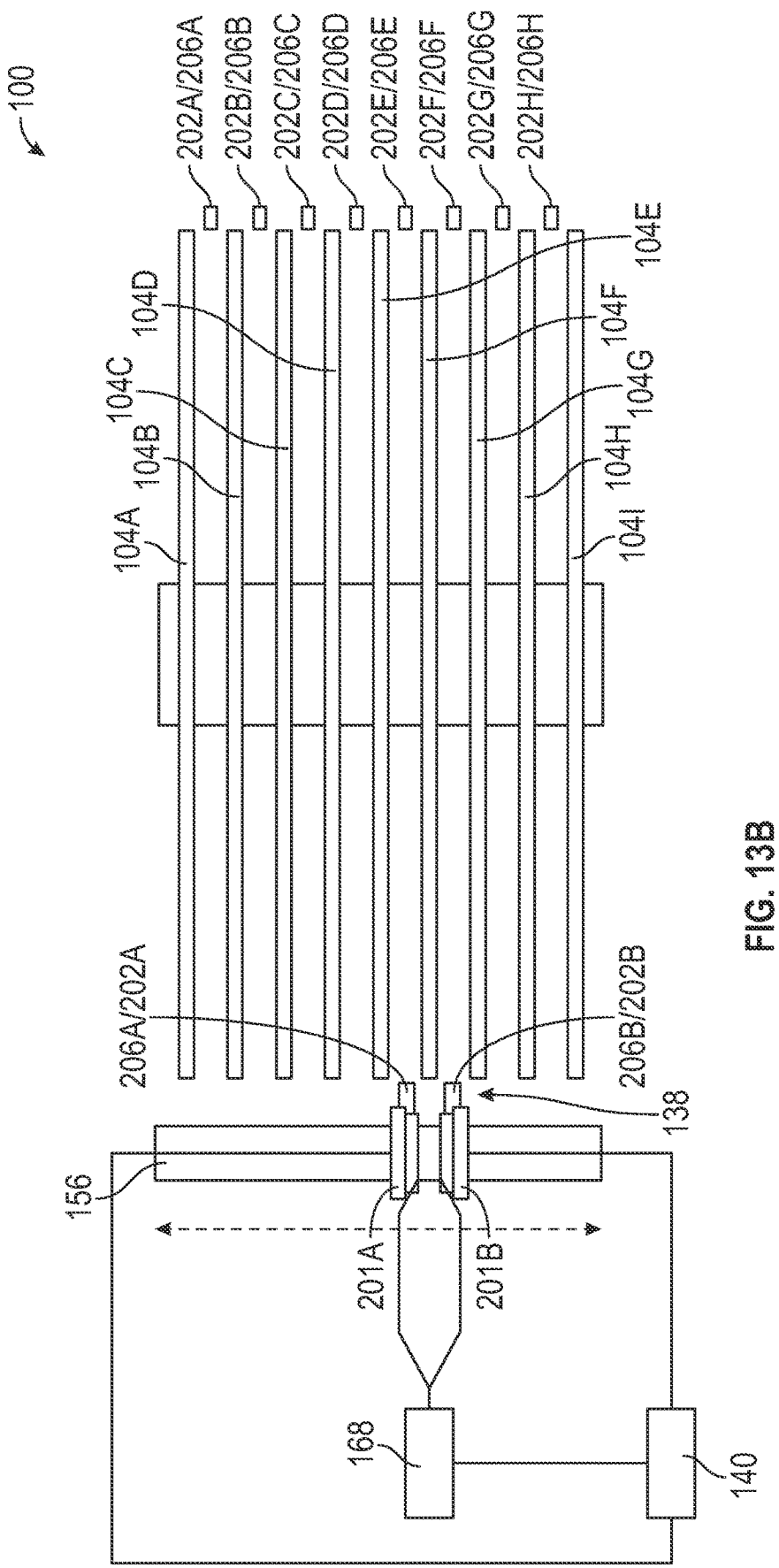
FIG. 13B is a side schematic illustration of a feedback system for fine adjustments in positioning an elevator.

FIG. 13A is a side schematic illustration of a portion of a data storage device. FIG. 13B is a side schematic diagram of a feedback system for fine adjustments in positioning an elevator. The feedback system allows for fine adjustment of head stack assembly (HSA) or head gimbal assembly (HGA) z-height 152, which is a distance between a load beam 120 of the HGA and a surface of a disc 104 directly above/below the load beam 120. Once the head is coarsely positioned over a particular disc surface, embodiments of the disclosure may be employed to make fine adjustments to the z-height 152 by moving the elevator 140 small distances up/down shaft 156, 256 in response to one or more different feedback signals, which are described further below.

In some embodiments, the HSA 138 and the moveable ramp portion 136b vertical position control (e.g., elevator 140 control) may utilize either a "bang-bang" control or an optical encoder. In the former, the HSA 138 is positioned at an uppermost position (where an upper stopper (not shown) proximate to a top cover (not shown) of data storage device 100 stops upward travel of the HSA 138) or a lowermost position (where a lower stopper (not shown) proximate to a base-deck 144 of data storage device 100 stops downward travel of the HSA 138). For the latter, an optical encoder provides positional feedback for adjusting a vertical position of elevator 140. Fine positioning of elevator 140 may be carried out in a manner described further below.

As shown in FIG. 13A, the position of load beam 120 relative to base-deck 144, which is dependent on the position of the HSA 138 (shown in FIG. 1) relative to the base-deck 144, is denoted by reference numeral 147. The z-height 152 is the distance between load beam 120 and the surface of disc 104. Actuator arm 122 is connected to load beam 120 and has a lift tab 157 at its distal/head end 142. A gimbal 159 is coupled to actuator arm 122, and head 102 is coupled to gimbal 159. During operation, head 102 flies close to the disc surface (such as by an air bearing created by the high speed rotation of the disc 104) at a fly height (FH) 160. Head 102 may include transducer elements 162 (e.g., reader(s)/writer(s)) to read data from and/or write data to disc surfaces. Head 102 may also include heaters or other fine positioning systems 164 to cause the transducer element(s) to protrude closer to the disc surface, thereby providing a desired head-media spacing (HMS) for the transducer(s) to suitably carry out read/write operations. Head 102 may also include one or more sensors 166 (such as a temperature coefficient of resistance sensor). Feedback signals obtained from different elements of head 102 and/or actuator 110 (shown in FIG. 1) are obtained by feedback circuitry 168 and provided to elevator 140, which may responsively move HSA 138 to control z-height 152.

Certain HDD designs have had failure modes related to head resonance and modulation fail modes that have been traced back to drive-level z-height 152 being off-target. Fail modes that may be impacted by a deviation from nominal z-height include head resonance and head modulation. A shift in z-height 152 directly affects pitch static attitude and preload 170 (gimbal vertical stiffness multiplied by z-height change) of the head. These changes directly affect pitch torque 172 and vertical forces experienced by each head 102 while flying above the disc 104. Alterations in the pitch torque 172 and the vertical force experienced by each head 102 may lead to either/both head resonance or/and change in fly attitude.

A second problem related to z-height 152 variability in the HDD is the loss of OD disc recording real estate owing to HGA lift tab 157 contact with the load/unload ramp 136. Early contact of lift tab with the ramp 136 will limit the extent of useable OD tracks (for recording). If the z-height 152 can be adjusted, then lift tab contact to the ramp 136 can occur more towards the OD 109 and higher on the ramp 136, adding more recording tracks, and ultimately increasing drive capacity.

Direct measurements of z-height 152 in certain HDD designs has revealed z-height shifts in drive assembly. These z-height shifts may be exacerbated due to variation in media lot thicknesses. It should be noted that other factors such as HSA tilt and/or disc tilt, the presence of burrs or other debris that effectively shift the HSA up, for example, may also contribute to the z-height being off target. In general, variance of dimensions of drive components such as discs and spacers as well as HSA installation may contribute to z-height shifts. The ability to control z-height within the HDD, and after assembly, adds margin against modulation and resonance failure modes, accommodates for fly height sensitivity to environmental changes, and increases drive capacity by allowing access to more OD tracks.

Embodiments of the disclosure utilize any of the aforementioned head spacing concepts to actuate the HSA 138 to adjust the individual z-height 152 of a read/write operation with feedback from, for example, field adjust fly height (FaFH) algorithms. In one embodiment, positioning of the HSA may be carried out as follows:

(1) With the heads 102 off disc 104 (lift tab 157 rests on ramp 136), the elevator 140 for HSA 138 and ramp 136 may employ optical encoder feedback or any other suitable feedback to arrive at the desired vertical position; this gets the HSA 138 to the desired height 147 of the load beam 120 relative to the base-deck 144.

(2) Next, the heads 102 are loaded onto the disc(s) 104. The elevator 140 is finely positioned to adjust z-height 152 based on at least one of three different feedback data/signals: a) "head heater power to contact" (for example, heater actuation until contact with the disc 104 is detected), b) reader-based feedback, or c) detected resonance.

"Head heater power to contact" involves incrementally applying power to a heater positioned within the head and using the thermal expansion of head materials to decrease head clearance to the disc until contact is made. The power is typically incremented from zero. However, an initial value other than zero may also be used. An initial power step applied to the heater may be relatively large (for example, 30 milliwatts (mW)) because, in most designs, contact will not result with the application of the relatively large initial power step. After the application of the initial power step, the power applied to the heater is subsequently incremented in smaller steps (for example, 0.5 mW) until contact is detected. Any suitable method for head-disc contact detection may be employed. For example, acoustic emission signals or servo signals may be utilized for contact detection. When acoustic emission is employed for contact detection, an acoustic emission sensor in the head or coupled to the head may be utilized to determine changes in fundamental and/or harmonic frequencies that are indicative of head-disc contact. Also, servo signals read by the head may be employed to detect, for example, head position changes that are a consequence of head-disc contact. Change in power to contact indicates a change in clearance.

Reader-based feedback algorithms may employ the Wallace spacing equation; this uses a written triple harmonic magnetic pattern and readback amplitude signal to calculate changes in HMS. Resonance can be detected through measured servo frequency response function or, in some cases, head-media spacing modulation measured by a head temperature coefficient of resistance (TCR) sensor signal that is dependent on spacing between the sensor and the media. In the embodiment of FIG. 13A, the feedback signal(s)/data are generated and/or obtained by circuitry 168, and provided to elevator 140, which carries out the fine positioning of the HSA 138 to adjust the z-height 152 based at least in part on the received feedback signal(s)/data.

During operations, active spacing of the head may be continuously monitored (by circuitry 168) for changes relative to the clearance set during drive calibration (such as certification in the factory, following manufacture), or it can be checked at set time intervals, or upon detection of a change in environment (such as pressure, humidity, or temperature, for example). For these monitoring applications, using reader (Wallace spacing) feedback may be suitable, as it will indicate if there are spacing changes relative to the HMS used during drive calibration in the factory.

In some embodiments, the z-height for the active head 102 in the drive (such as the head 102 performing the current read/write operation) is tuned. Stated another way, the HSA 138 position can be adjusted for each individual head-disc interface according to which interface is being written or read. Alternatively, there could be a predetermined elevator position for up-facing heads, and a different predetermined position for down-facing heads. This would add some latency to data access owing to the time required to shift the elevator position; there may be some use cases where this latency would be allowable owing to data buffers (such as use cases where data is streaming or used for surveillance, for example).

Similar head adjustments could be made, with the aforementioned FH, resonance, or power-to-contact feedback, using other head actuation schemes using for example, but not limited to, head heater(s) or other mechanical actuators co-located at the head. It is also noted that the feedback may not be limited to reader feedback, and could utilize, for example, TCR sensor 166 feedback. TCR sensors are based on the principle of resistance change due to temperature change. Temperature changes as a function of spacing or FH owing to pressure changes in the air proximal to the exposed sensor. As indicated above, other forms of feedback on head-disc contact or feedback on the change in head-disc gap include acoustic emission, as detected by an acoustic emission sensor, or cross track position change, measured by the reader, that is the consequence of head-disc contact. Also, as indicated above, elevator 140 may linearly move the HSA 138 along the shaft 156 to adjust a distance between the load beam 120 and the surface of the data storage disc 104 in response to receiving a feedback signal indicative of close proximity, or contact, between the lift tab 157 and the front edge 137 of the ramp 136 when the head 102 approaches the OD 109.

FIG. 13B is a diagrammatic illustration that shows a side view of a data storage device 100 that employs a coarse positioning system and multiple fine positioning systems for HSA 138 including HGAs 201A and 201B on upper load beam 120*a* and lower load beam 120*b*, respectively. In one embodiment, transmitters 202A and 202B may be coupled to HGAs 201A and 201B, respectively, and receivers 206A-206H may be positioned on an opposite side of discs 104A-104I. In the interest of simplification, support structures for the receivers 206A-206H are not shown. In an alternate embodiment, receivers 206A and 206B may be coupled to HGAs 201A and 201B, respectively, and transmitters 202A-202H may be positioned on an opposite side of discs 104A-104I. In general, the transmitters and receivers may be positioned at any different suitable locations in different embodiments. In some embodiments, each of elements 202A-202H may be an optical source. In other embodiments, elements 202A-202H may not each be optical sources. For example, a separate single optical source (not shown) or two optical sources (each providing a different optical frequency signal) (not shown), may provide optical signals to some or all of elements 202A-206H via optical fibers. Alternatively, elements 202A-202H may be mirrors that reflect signals from the separate optical source(s) or light pipes such as optical fibers.

Coarse positioning of HSA 138 including HGAs 201A and 201B along shaft 156 may be carried out in any suitable manner. For example, to carry out coarse positioning (for example, to bring actuator arm portions 122*a*, 122*b* carrying HGAs 201A and 201B from the bottom of shaft 156 to disc 104F as shown in FIG. 13B) the HSA 138 including the HGAs 201A and 201B may simply be moved using a count of 4 discs in an upward direction. Once the HGAs 201A and 201B are coarsely positioned at disc 104F, and if HGA 201A includes attached receiver 206A and HGA 201B includes attached receiver 206B, initial fine movement of the HSA 138 including the HGAs 201A and 201B along shaft 156 may take place until signals sent from transmitters 202E and 202F are received by receivers 206A and 206B, respectively. The movement of the HSA 138 along the shaft 156 may be stopped when the respective received signals or combination of signals are at or above a predetermined strength. An elevator 140 may be employed to direct or control certain aspects the coarse and first fine positioning operations. Additionally, further fine positioning may be carried out with the help of feedback circuitry 168 coupled to heads 102 and to elevator 140.

The above-included description relates to optical feedback and encoding systems for initial fine positioning of an elevator. However, in different embodiments, non-optical encoders such as magnetic encoders may instead be utilized for initial fine positioning of an elevator. Other examples of non-optical encoders and positioning systems include, resistance, inductive, capacitive, and tactile systems using piezoelectric elements or limit switches or other electro mechanical systems.

Figure 14:
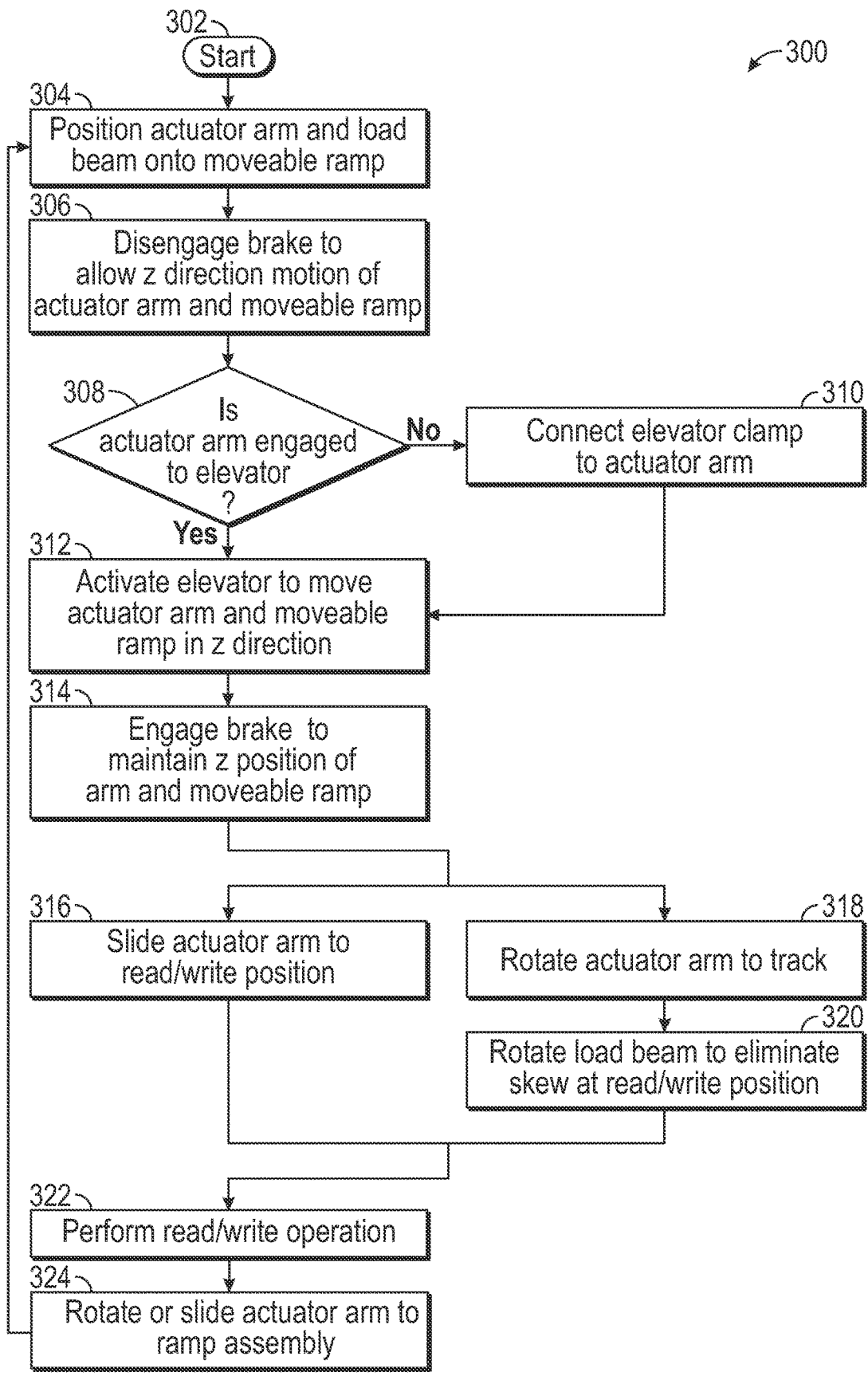
FIG. 14 is a flowchart of an example method for using the described systems.

FIG. 14 is a simplified flow diagram of a method 300 of using a zero skew elevator system in accordance with exemplary embodiments. The method may be carried out in devices of the type described above in connection with FIGS. 1-13B. The method starts at 302 and proceeds to 304, which includes moving actuator arm 122 to place a load beam 120 of the actuator arm 122 onto a movable ramp 136*b*. At 306, brake assembly 158 is disengaged. At 308, a query is performed regarding whether actuator arm 122 is operably engaged to elevator 140. For example, for DSD 100A of FIGS. 2 and 5 and for DSD 100B of FIGS. 9-11, actuator arm 122 is always operably engaged to elevator 140. However, for DSD 100C of FIGS. 12A-12D, actuator arm 122 is not always operably engaged to elevator 140. If the answer to query 308 is "no," the method moves to 310, in which the actuator arm 122 is operably connected to the elevator 140 (for example, as described above with reference to FIGS. 12B and 12C). Then the method proceeds to 312, which includes activating the elevator 140 to move actuator arm 122 to in a z direction to a desired location relative to the disc stack. At 314, brake assembly 158 is engaged to retain actuator arm 122 in the desired z position.

In the "linear actuator" embodiments of FIGS. 9-12C, the method continues to 316, at which the actuator arm 122 is slid along rails 230 in a straight line the x-y plane to place the head 102 in a desired read/write position relative to a disc surface. In the "two-pivot" embodiment of FIGS. 2-5, the method continues to 318, at which the actuator arm 122 is rotated about a first pivot axis 126 toward a desired track 114. Then, at 320, the load beam is rotated about a second pivot axis 128 to eliminate skew between the head 102 and the track 114, thereby placing the head 102 in a desired read/write position relative to a disc surface. In all embodiments, placing the head 102 in a desired read/write position relative to the disc surface optionally includes performing fine z-height adjustments, as described above with reference to FIGS. 13A and 13B.

At 322, a read/write operation is performed by head 102 of load beam 120 on disc 104. At 324, after the read/write operation is complete, actuator arm 122 is pivoted about pivot axis 126, 128 or slid along rails 230 to move the load beam 120 off the disc 104. To read/write relative to another disc 104, the method can return to 304, wherein the load beam 120 is positioned to rest on ramp assembly 136.

FIG. 5 shows components of a head stack assembly 138A', which uses a brake assembly 158, as shown in FIGS. 6 and 7. As shown in FIGS. 2-4, the head stack assembly 138A uses similar principles of piezoelectric element actuation in a brake crawler 158A, as described with respect to FIGS. 8A-8D. FIGS. 15A-15D show some components of the head stack assembly 138A removed from data storage device 100A. In an exemplary embodiment, stack block 400 includes bore 402 configured for the receipt of bearing 124 (shown in FIG. 2). In an exemplary embodiment, voice coil bracket 404 is fixed on stack block 400. Columns 406 of low friction material are provided at two of the corners of the generally triangular (in cross section) stack block 400.

For the brake crawler 158A as depicted in FIGS. 2-4 and 15A-15D, clamp arms 522 of first clamp arm assembly 520 and second clamp arm assembly 530 are configured to frictionally hold against an outside wall surface 408 of stack block 400 rather than the vertical guide post 156 of FIG. 8A. However, in other respects, the crawling and braking action of the first and second clamp arm assemblies 520, 530 along stack block 400 is similar to that described above with reference to FIGS. 8A-8D along guide post 156. In the embodiment of FIGS. 2-4 and 15A-15D, the entire stack block 400 and its attached voice coil bracket 404, brake crawler 158A, and actuator arm 122 can pivot freely about axis 126 (labeled in FIG. 2) even when a z-direction position of the brake crawler 158A and its associated actuator arm 122 is held at a particular z-direction location (vertical height location) against stack block 400.

Figure 15A:
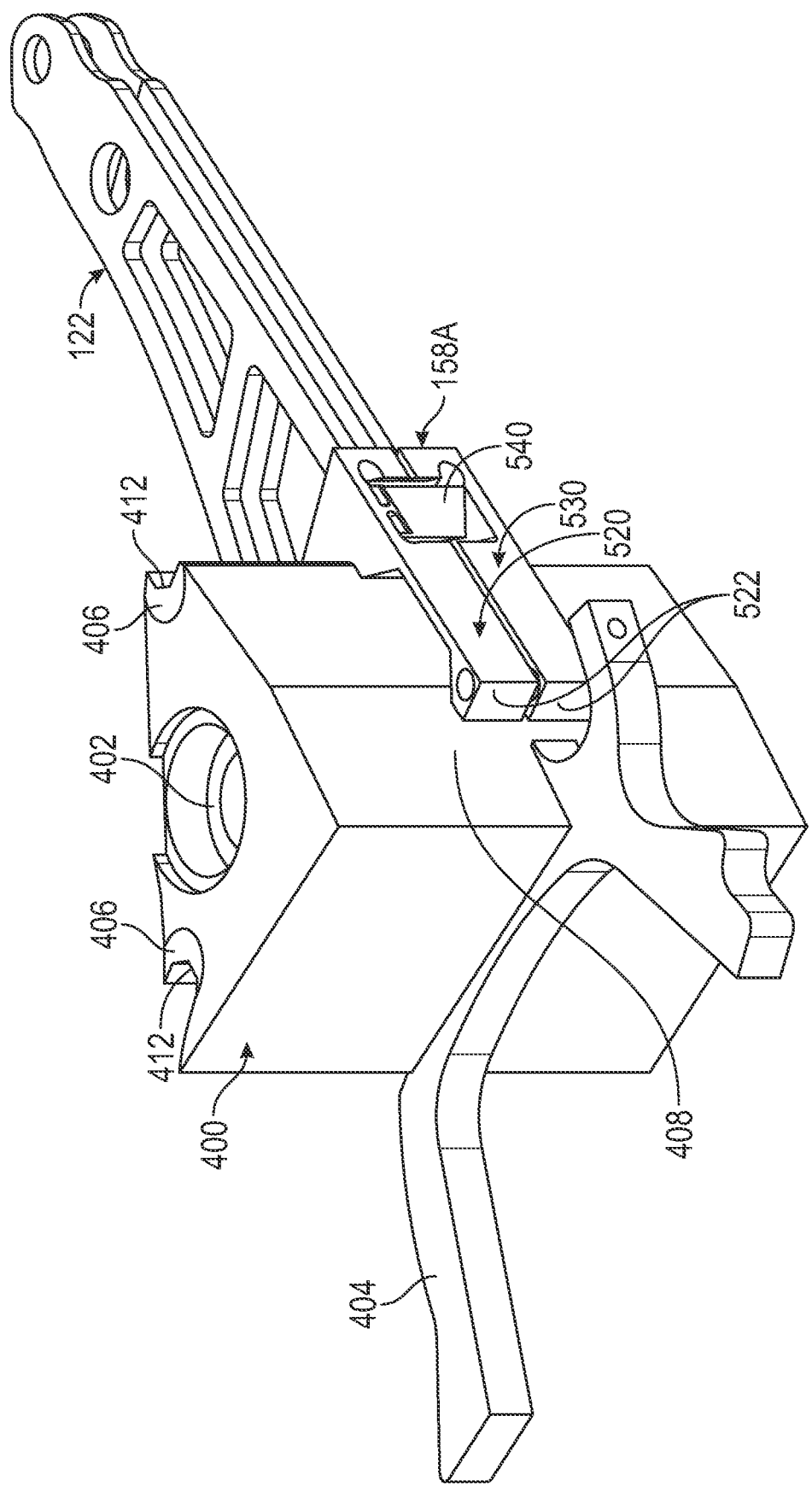
FIG. 15A is a perspective view of some components of an actuator and arm assembly of the embodiment of FIGS. 2-4.
Figure 15B:
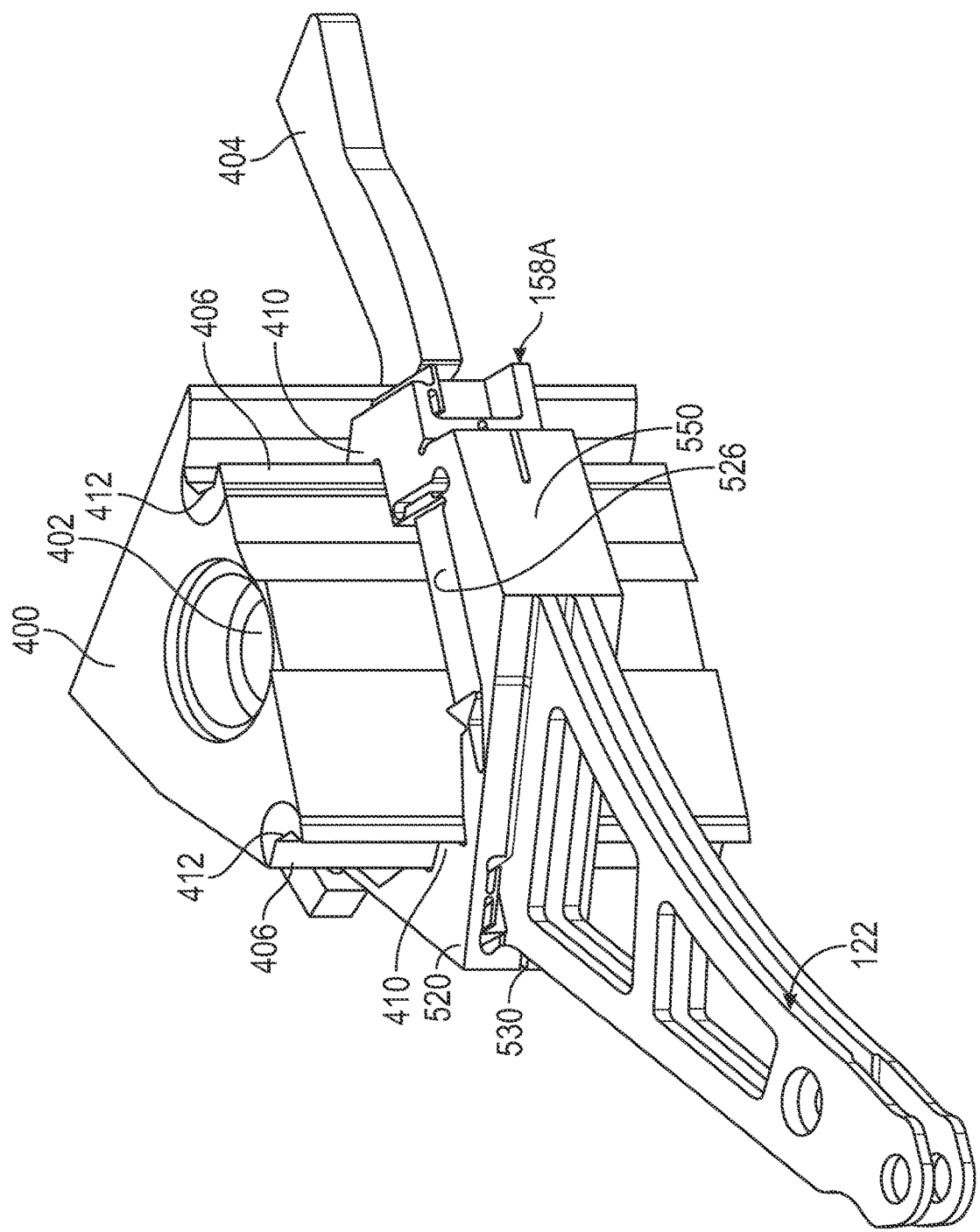
FIG. 15B is a perspective view of the components of FIG. 15A, rotated partially clockwise toward a viewer.
Figure 15C:
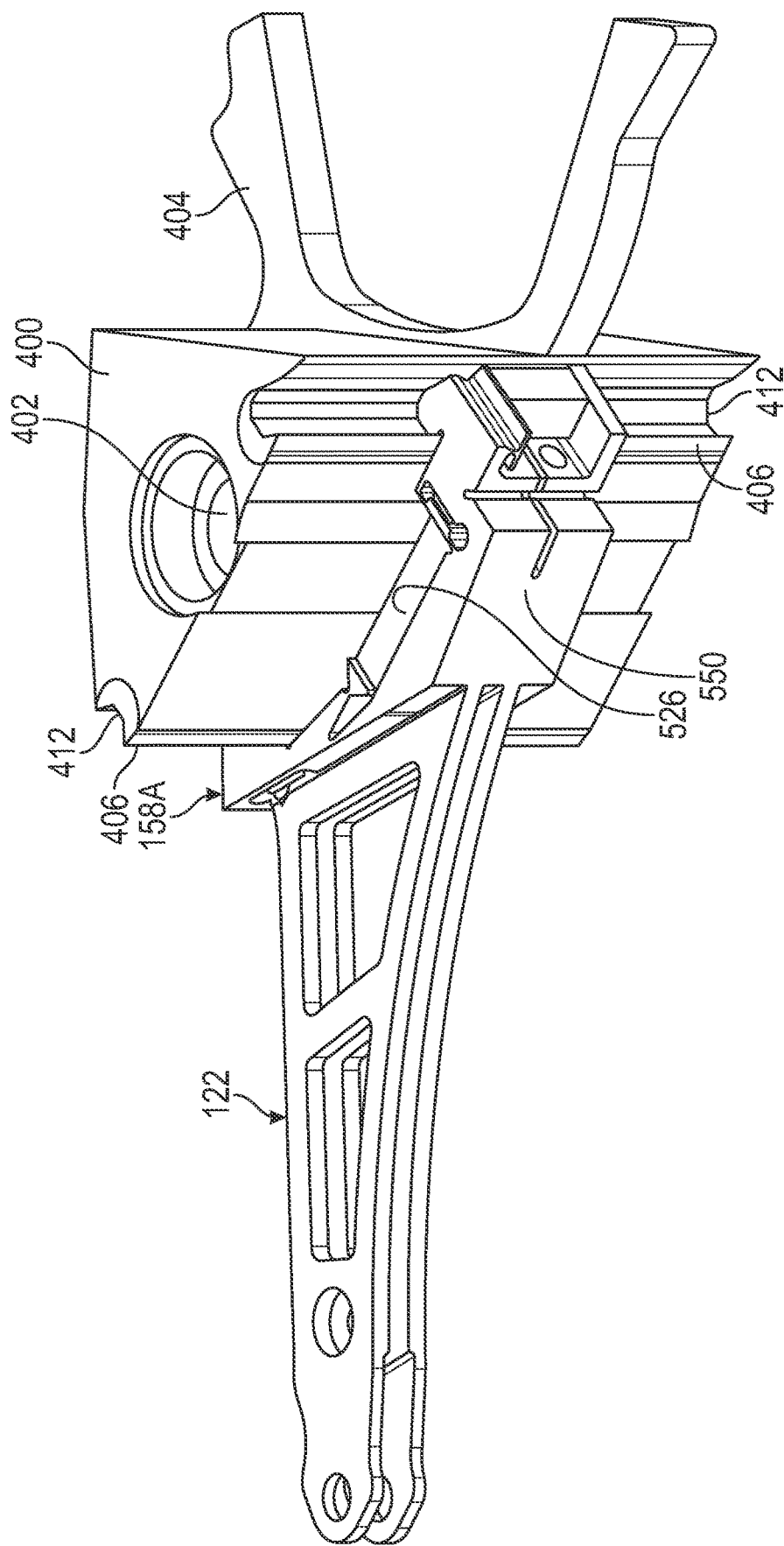
FIG. 15C is a perspective view of the components of FIG. 15A, rotated further clockwise relative to a viewer.
Figure 15D:
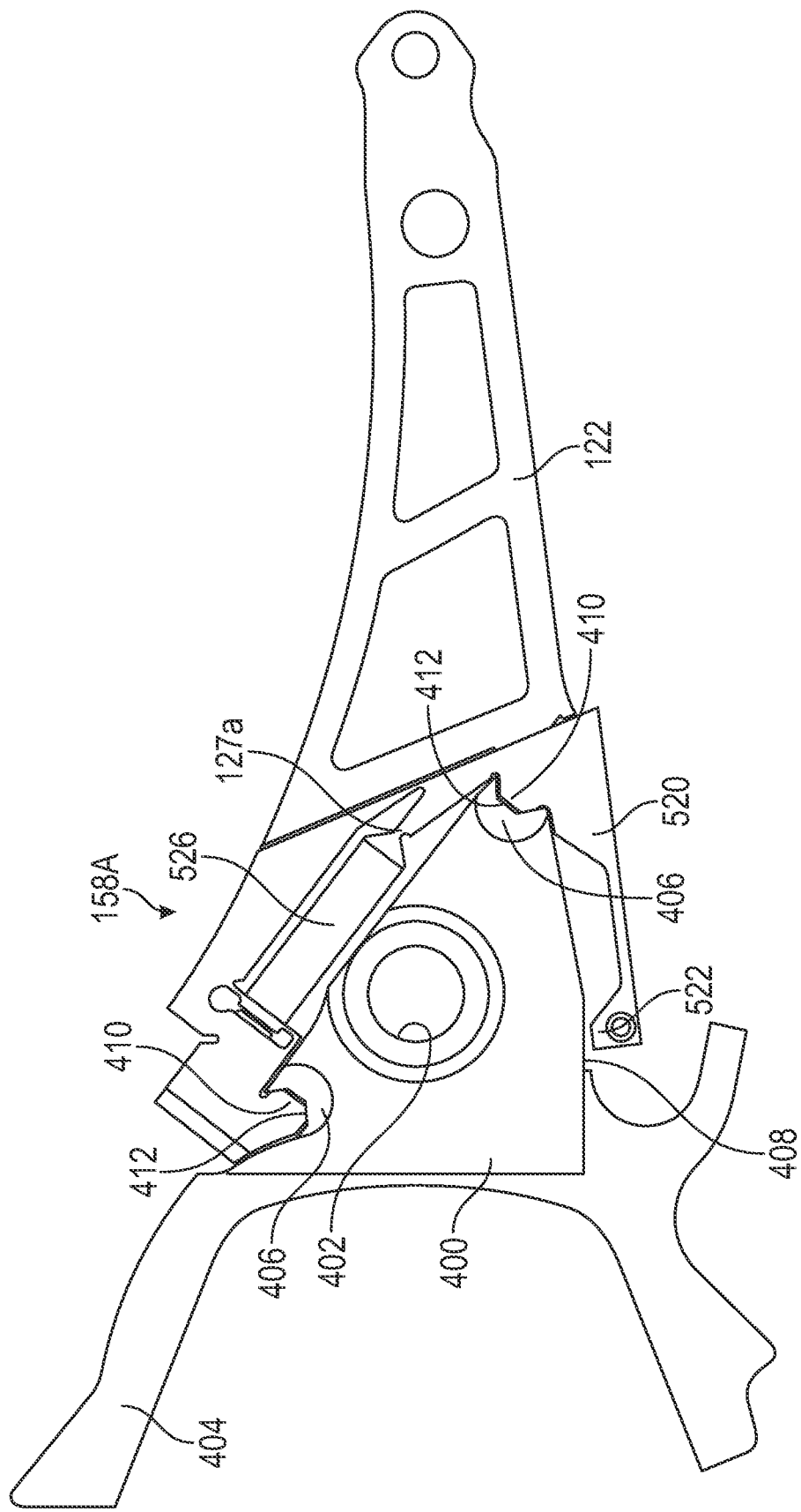
FIG. 15D is a top plan view of the components shown in FIG. 15A.

In an exemplary embodiment as shown in FIGS. 15A-15D, the exemplary brake crawler 158A has projections 410 that slide up and down within recesses 412 of low friction columns 406. Actuator element 526 is shown in FIG. 15D in a retracted state, wherein first clamp arm 522 is spaced from wall surface 408. Vertical crawling motion is accomplished by the piezoelectric element 540 and motion at flex point 550, as explained above with reference to FIGS. 8B-8D.

When arm 122 reaches a desired z direction position, braking action is accomplished by activating actuator element 526 to expand in length; movement at flex point 127A causes first clamp arm 522 to press against wall surface 408, thereby holding a vertical or z-direction position of the brake crawler 158A and its associated actuator arm 122 at a chosen height or z-direction position against stack block 400.

The illustrations of the embodiments described herein are intended to provide a general understanding of the structure of the various embodiments. The illustrations are not intended to serve as a complete description of all of the elements and features of apparatus and systems that utilize the structures or methods described herein. Features described with respect to any embodiment also apply to any other embodiment. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. All patent documents mentioned in the description are incorporated by reference.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. For example, features described with respect to one embodiment may be incorporated into other embodiments. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
    a data storage disc having a read/write surface defining an x-y plane;
    an arm that is movable relative to the disc, the arm comprising a first portion and a load beam;
    a head supported by the load beam, wherein the head is configured to interact with the read/write surface;
    a rotary actuator configured to move the first portion of the arm about a first pivot axis in the x-y plane;
    an elevator configured to move the arm in a z direction relative to a vertical surface and configured to frictionally engage the vertical surface to hold the arm at a z direction position while allowing the rotary actuator to move the first portion of the arm about the first pivot axis; and
    a stack block configured to pivot about the first pivot axis with the first portion of the arm, the stack block comprising the vertical surface.

2. The data storage device of claim 1, wherein the elevator comprises a piezoelectric crawler.

3. The data storage device of claim 1, comprising a voice coil bracket attached to the stack block.

4. The data storage device of claim 1, comprising a movable ramp that is configured to move in unison with the arm in the z direction.

5. The data storage device of claim 1, comprising a fine positioning system configured to move the elevator to adjust a z-height between the load beam and the read/write surface.

6. The data storage device of claim 1, comprising a pivot actuator configured to move the load beam about a second pivot axis relative to the first portion of the arm in the x-y plane.

7. The data storage device of claim 1, wherein the data storage device further comprises:
    a first clamp arm assembly of the elevator configured to selectively frictionally engage the vertical surface;
    a second clamp arm assembly of the elevator configured to selectively frictionally engage the vertical surface;
    a first piezoelectric actuator configured to move the first clamp arm assembly into and out of engagement with the vertical surface,
        wherein the first clamp arm assembly is positionally held to the vertical surface when the first clamp arm assembly is engaged with the vertical surface, and
        wherein the stack block is rotatable about the first pivot axis when the first clamp arm assembly is engaged with the vertical surface; and
    a second piezoelectric actuator configured to move the second clamp arm assembly relative to the first clamp arm assembly and relative to the vertical surface.

8. The apparatus of claim 7, comprising a voice coil bracket attached to the stack block.

9. The apparatus of claim 7, wherein the first portion of the arm is attached to at least one of the first or the second clamp arm assemblies.

10. The apparatus of claim 7, wherein at least one of the first or the second clamp arm assemblies comprises a projection configured to move within a recess of the stack block.

11. A method comprising:
    providing a data storage disc having a read/write surface defining an x-y plane;
    providing an arm that is movable relative to the disc, the arm comprising a first portion and a load beam;
    providing a head supported by the load beam, wherein the head is configured to interact with the read/write surface;

providing a stack block that is capable of pivoting about the first pivot axis with the first portion of the arm, the stack block having a vertical surface;

enabling the arm to be moveable in a z direction relative to the vertical surface; and holding the arm at a z direction position by frictionally engaging the vertical surface of the stack block while enabling the first portion of the arm to be moveable about a first pivot axis in the x-y plane.

12. The method of claim 11 comprising enabling the load beam to be moveable about a second pivot axis relative to the first portion of the arm in the x-y plane.

13. The method of claim 11 comprising:

supporting the load beam on a moveable ramp that is positioned proximate to an outer diameter of the data storage disc; and activating an elevator to move the first portion of the arm and the moveable ramp in unison in the z direction.

14. The method of claim 13, comprising physically connecting the elevator to the first portion of the arm.

15. The method of claim 13, comprising providing a fine positioning system to move the elevator to adjust a z-height between the load beam and a surface of the disc.

16. The method of claim 15, including providing feedback circuitry connected to at least one transmitter and at least one receiver to control the fine positioning system.

17. The method of claim 11, comprising moving the load beam in the x-y plane to position the head with zero skew relative to a track of the disc.

18. The method of claim 11, comprising:

rotating the first portion of the arm in the x-y plane about the first pivot axis; and rotating the load beam in the x-y place about a second pivot axis relative to the first portion of the arm.

* * * * *

UNITED STATES PATENT AND TRADEMARK OFFICE
CERTIFICATE OF CORRECTION

PATENT NO. : 11,948,612 B2
APPLICATION NO. : 17/942370
DATED : April 2, 2024
INVENTOR(S) : Riyan Alex Mendonsa et al.

It is certified that error appears in the above-identified patent and that said Letters Patent is hereby corrected as shown below:

In the Claims

Column 24, Claim 18, Line 15, please replace the word "place" with the word --plane--.

Signed and Sealed this
Seventh Day of May, 2024

*Katherine Kelly Vidal*

Katherine Kelly Vidal
*Director of the United States Patent and Trademark Office*